United States Patent
Wright

(10) Patent No.: US 11,616,641 B2
(45) Date of Patent: Mar. 28, 2023

(54) COMPUTER IMPLEMENTED SYSTEM AND METHOD FOR SHARING A COMMON SECRET

(71) Applicant: nChain Licensing AG, Zug (CH)

(72) Inventor: Craig Steven Wright, London (GB)

(73) Assignee: nChain Licensing AG, Zug (CH)

(*) Notice: Subject to any disclaimer, the term of this patent is extended or adjusted under 35 U.S.C. 154(b) by 0 days.

(21) Appl. No.: 17/278,198

(22) PCT Filed: Sep. 11, 2019

(86) PCT No.: PCT/IB2019/057632
§ 371 (c)(1),
(2) Date: Mar. 19, 2021

(87) PCT Pub. No.: WO2020/058806
PCT Pub. Date: Mar. 26, 2020

(65) Prior Publication Data
US 2021/0367772 A1    Nov. 25, 2021

(30) Foreign Application Priority Data
Sep. 21, 2018  (GB) ..................................... 1815396

(51) Int. Cl.
*H04L 9/08* (2006.01)
*H04L 9/30* (2006.01)

(52) U.S. Cl.
CPC ............ *H04L 9/0841* (2013.01); *H04L 9/085* (2013.01); *H04L 9/0825* (2013.01); *H04L 9/3066* (2013.01)

(58) Field of Classification Search
None
See application file for complete search history.

(56) References Cited

U.S. PATENT DOCUMENTS 7,958,356 B1    6/2011  Subramanian et al.
8,510,561 B2 *  8/2013  Little ................. H04W 12/0431
                                                 380/279

(Continued)

FOREIGN PATENT DOCUMENTS

EP          2363977 A1 *  9/2011  ........... H04L 63/065
WO   WO-2017145010 A1 *  8/2017  ............. G06Q 20/36

OTHER PUBLICATIONS

Ibrahim M. H. et al: "A robust threshold elliptic curve digital signature providing a new verifiable secret sharing scheme", Midwest symposium on circuits and systems. Cairo, Egypt, Dec. 27-30, 2003; [Midwest symposium on circuits and systems]. (Year: 2003).*

(Continued)

*Primary Examiner* — Bassam A Noaman
(74) *Attorney, Agent, or Firm* — Davis Wright Tremaine LLP

(57) ABSTRACT

A method of sharing a first common secret among a plurality of nodes for enabling secure communication for blockchain transactions. The method comprises determining, for at least one first node a plurality of second common secrets, wherein each second common secret is common to the first node and a respective second node, is determined at the first node based on a first private key of the first node and a first public key of the second node and is determined at the second node based on the first private key of the second node and the first public key of the first node. The method further comprises exchanging encrypted shares of the first common secret among the plurality of nodes to enable each of the plurality of nodes to reach a threshold number of shares of the first common secret to access the first common secret.

30 Claims, 11 Drawing Sheets

(56) References Cited

U.S. PATENT DOCUMENTS

| | | | |
|---|---|---|---|
| 10,050,779 B2 | 8/2018 | Alness et al. | |
| 2015/0213433 A1 | 7/2015 | Khan | |
| 2016/0335440 A1* | 11/2016 | Clark | H04L 9/085 |
| 2016/0352710 A1* | 12/2016 | Hibshoosh | H04L 63/061 |
| 2017/0093811 A1* | 3/2017 | Dolev | H04L 45/1287 |
| 2017/0249460 A1* | 8/2017 | Lipton | G06F 21/566 |
| 2019/0305940 A1* | 10/2019 | Bhabbur | H04L 9/3226 |

OTHER PUBLICATIONS

Antonopoulos, "Mastering Bitcoin—Unlocking Digital Cryptocurrencies," O'Reilly Media, Inc., Dec. 20, 2014, 282 pages.
Harn et al., "Threshold Signature Scheme Without Using Polynomial Interpolation," International Journal of Network Security, Jul. 2016, 8 pages.
International Search Report and Written Opinion dated Mar. 26, 2020, Patent Application No. PCT/IB2019/057632, 13 pages.
International Search Report and Written Opinion dated Nov. 18, 2019, Patent Application No. PCT/IB2019/057632, 15 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0; prev_next=prev, 2 pages.
UK IPO Search Report dated Mar. 1, 2019, Patent Application No. GB1815396.5, 3 pages.

* cited by examiner

COMPUTER IMPLEMENTED SYSTEM AND METHOD FOR SHARING A COMMON SECRET

This disclosure relates generally to a method of sharing a common secret among a plurality of nodes, and more particularly to a method of sharing a common secret among at least three nodes. The disclosure is particularly suited, but not limited to, use in cryptography to enable secure communication between the nodes, and may be suited for use with, but not limited to, digital wallets, blockchain (eg: Bitcoin) technologies and personal device security.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain and alternative blockchain implementations and protocols fall within the scope of the present disclosure. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

International patent application WO 2017/145016 discloses a method of sharing a common secret between two nodes to enable secure communication between the nodes. However, it is desirable to provide a method of sharing a common secret among more than two nodes.

Such an improved solution has now been devised.

Thus, in accordance with the present disclosure, there is provided a method as defined in the appended claims.

In accordance with the disclosure there may be provided a method of sharing a first common secret among a plurality of nodes, wherein each said node is associated with a respective asymmetric cryptography first key pair having a respective first private key and a respective first public key of a cryptography system common to said plurality of nodes, and wherein the first common secret is based on the first private key of each of said nodes, the method comprising:—
determining, for at least one first node, a plurality of second common secrets, wherein each said second common secret is common to said first node and a respective second node, is determined at said first node on the basis of the first private key of the first node and the first public key of the second node, and is determined at the second node on the basis of the first private key of the second node and the first public key of the first node, wherein a plurality of shares of the first common secret are each based on at least one respective second common secret such that said first common secret is accessible to a threshold number of said shares but is inaccessible to less than said threshold number of shares;
determining, for at least one second node, at least one respective third common secret, wherein the or each respective third common secret is common to said second node and a respective third node, is determined at said second node on the basis of the first private key of the second node and the first public key of the third node, and is determined at the third node on the basis of the first private key of the third node and the first public key of the second node, and wherein at least one share of the first common secret is based on at least one respective said third common secret;
encrypting, at at least one said first node, at least one share of said first common secret known to said first node, on the basis of a second private key of a respective asymmetric cryptography second key pair of a cryptography system, wherein said second key pair is based on a respective said second common secret known to said first node;
sending at least one said encrypted share from said first node to the respective said second node with which the second common secret on which said second key paid is based is common; and
receiving, at at least one said first node, from at least one said second node, at least one respective share of said first secret known to said second node and encrypted on the basis of a second private key of a respective asymmetric cryptography second key pair of said cryptography system, wherein said second key pair is based on the second common secret common to said first node and said second node, to enable each of said plurality of nodes to reach said threshold number of shares of said first common secret.

This provides the advantage of providing an efficient method of sharing a common secret between the plurality of nodes, which can then be used as the basis of secure communication between the nodes.

A plurality of said encrypted shares may be each based on a combination of a plurality of said common secrets known to the corresponding said node.

This provides the advantage of improving effiency, while also enabling the individual common secrets to be obscured to third parties, thereby improving privacy, for example when the shared secrets are included in scripts of blockchain transactions.

A plurality of said encrypted shares may each be based on at least one respective XOR combination of a plurality of said common secrets known to the corresponding said node.

This provides the advantage of being simple to process, thereby enabling simple recovery of the first common secret by a recipient node.

A plurality of said encrypted shares may be based on multiplicative combination of a plurality of said common secrets known to the corresponding said node.

The multiplicative combination may be of the form $(x_1 \cdot x_2 \cdot x_3) \bmod n$, wherein $x_1, x_2, x_3$ are common secrets known to a node, and n is the order of a cryptography system.

A plurality of said shares may be shares of a first polynomial function, and the first secret may be determined by means of polynomial interpolation of at least a threshold number of said shares.

The method may further comprise:
receiving at least a threshold number of shares of said first common secret, wherein each said share corresponds to a respective value of the first polynomial function; and
determining said first polynomial function, by means of determining coefficients of the first polynomial function from a plurality of known values of said shares, to determine said first common secret.

The step of determining said first polynomial function may comprise executing an error correction algorithm.

The step of determining said first polynomial function may comprise executing a Berlekamp-Welch decoding algorithm.

The step of determining said first polynomial function may comprise:
defining an error locator polynomial function and a second polynomial function, wherein the second polynomial function is a product of said first polynomial function and said error locator polynomial function, determining coefficients of said second polynomial function and said error locator polynomial function from a plurality of known values of said partial signatures, and determining said first polynomial function from said second polynomial function and said error detector polynomial function, to determine the first common secret.

At least one said cryptography system may have a homomorphic property.

This provides the advantage of enabling more flexible and efficient operation of the method.

At least one said cryptography system may be an elliptic curve cryptography system.

This provides the advantage of high security for a given key size.

The method may further comprise determining said first private key of at least one said first node based on at least a first node master private key ($V_{1C}$) and a deterministic key (DK) common with the first and second nodes;
determining said first public key of at least one said second node ($P_{2S}$) based on a master public key ($P_{1S}$) of the second node and encryption of the deterministic key (DK) using the common cryptography system.

The deterministic key (DK) may be based on a message (M).

The method may further comprise:
generating a first signed message (SM1) based on the message (M) and the first private key of the first node ($V_{2C}$); and sending, over the communications network, the first signed message (SM1) to the second node (S),
wherein the first signed message (SM1) can be validated with a first public key of the first node ($P_{2C}$) to authenticate the first node (C).

The method may further comprise:
receiving, over the communications network, a second signed message (SM2) from the second node (S);
validating the second signed message (SM2) with the first public key of the second node (P2S); and
authenticating the second node (S) based on the result of validating the second signed message (SM2),
wherein the second signed message (SM2) was generated based on the message (M), or a second message (M2), and the first private key of the second node ($V_{2S}$).

The method may further comprise:
generating a message (M); and
sending, over a communications network, the message (M) to the second node (S).

The method may further comprise:
receiving the message (M), over the communications network, from the second node (S).

The method may further comprise:
receiving the message (M), over the communications network, from another node.

The method may comprise:
receiving the message (M) from a data store, and/or an input interface associated with the first node (C).

The cryptography system may be an elliptic curve cryptography (ECC) system and the first node master public key ($P_{1C}$) and second node master public key ($P_{1S}$) may be based on elliptic curve point multiplication of respective first node master private key ($V_{1C}$) and second node master private key ($V_{1S}$) and a generator (G).

The method may further comprise the steps of:
receiving, over the communications network, the second node master public key ($P_{1S}$); and
storing, at a data store associated with the first node (C), the second node master public key ($P_{1S}$).

The method may further comprise the steps of:
generating, at a first node (C), the first node master private key ($V_{1C}$) and the first node master public key ($P_{1C}$);
sending, over the communications network, the first node master public key ($P_{1C}$) to the second node (S) and/or other node; and
storing, in a first data store associated with the first node (C), the first node master private key ($V_{1C}$).

The method may further comprise:
sending, over the communications network, to the second node, a notice indicative of using a common cryptography system for the method of determining at least one said common secret (CS), and
wherein the step of generating the first node master private key ($V_{1C}$) and the first node master public key ($P_{1C}$) comprises:
generating the first node master private key ($V_{1C}$) based on a random integer in an allowable range specified in the common cryptography system; and
determining the first node master public key ($P_{1C}$) based on encryption of the first node master private key ($V_{1C}$).

The common cryptography system may be an elliptic curve cryptography (ECC) system with a common generator (G) and the first node master public key ($P_{1C}$) may be determined based on elliptic curve point multiplication of the first node master private key ($V_{1C}$) and the common generator (G) according to the following formula:

$$P_{1C} = V_{1C} \times G.$$

The method may further comprise:
determining the deterministic key (DK) based on determining a hash of the message (M), and
wherein the step of determining the first private key of the first node (V2C) is based on a scalar addition of the first node master private key ($V_{1C}$) and the deterministic key (DK) according to the following formula:

$$V_{2C} = V_{1C} \pm DK, \text{ and}$$

wherein the step of determining the first public key of the second node (P2S) is based on the second node master public key ($P_{1S}$) with elliptic curve point addition to the elliptic curve point multiplication of the deterministic key (DK) and the common generator (G) according to the following formula:

$$P_{2S} = P_{1S} + DK \times G.$$

The deterministic key (DK) may be based on determining a hash of a previous deterministic key.

The disclosure may also provide a method of secure communication between a plurality of nodes, wherein the method comprises:
determining a first common secret by means of a method as defined above;
determining a symmetric-key based on the common secret;
encrypting a first communication message, with the symmetric-key, to an encrypted first communication message; and
sending, over a communications network, the encrypted first communication message from one of said plurality of nodes to the other nodes of said plurality of nodes.

The method further may comprise:
receiving, over a communications network, an encrypted second communication message from a node of said plurality of nodes; and
decrypting the encrypted second communication message, with the symmetric-key, to a second communication message.

The disclosure may further provide a method of performing an online transaction between a plurality of nodes, wherein the method comprises:
determining a first common secret by means of a method as defined above;
determining a symmetric-key based on the first common secret;
encrypting a first transaction message, with the symmetric-key, to an encrypted first transaction message;
sending, over a communications network, the encrypted first transaction message from a first node of said plurality of nodes to the other nodes of said plurality of nodes.

The disclosure also provides a system, comprising:
a processor; and
memory including executable instructions that, as a result of execution by the processor, causes the system to perform any embodiment of the computer-implemented method described herein.

The disclosure also provides a non-transitory computer-readable storage medium having
stored thereon executable instructions that, as a result of being executed by a processor of a computer system, cause the computer system to at least perform an embodiment of the computer-implemented method described herein.

These and other aspects of the present disclosure will be apparent from and elucidated with reference to, the embodiment described herein. An embodiment of the present disclosure will now be described, by way of example only, and with reference to the accompanying drawings, in which.

OVERVIEW

Figure 1:
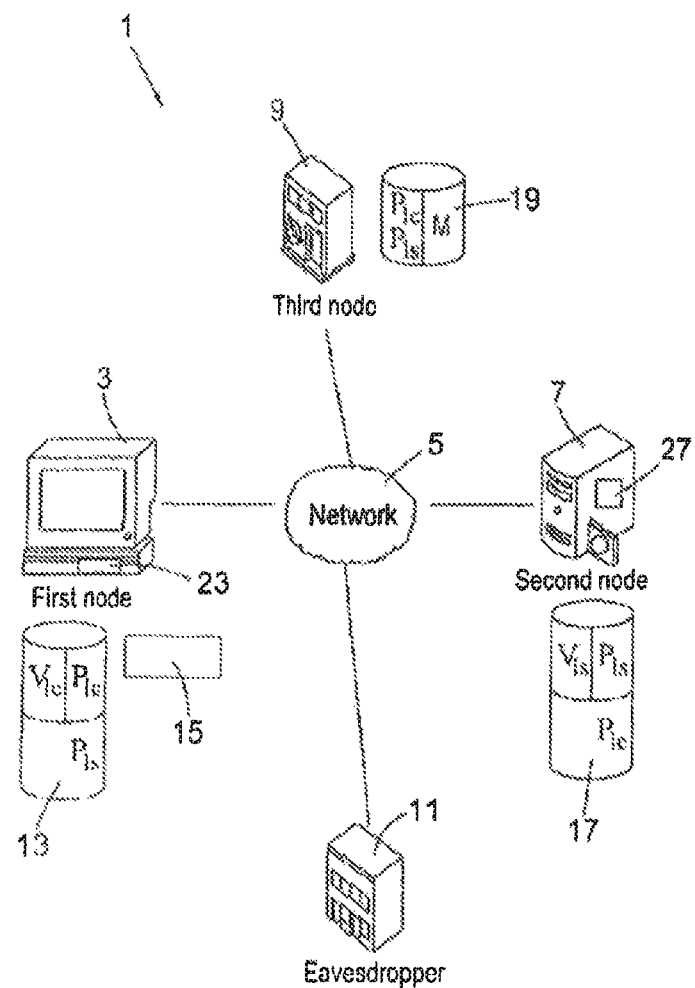
FIG. 1 is a schematic diagram of an example system to determine a common secret for a first node and second node.
Figure 2:
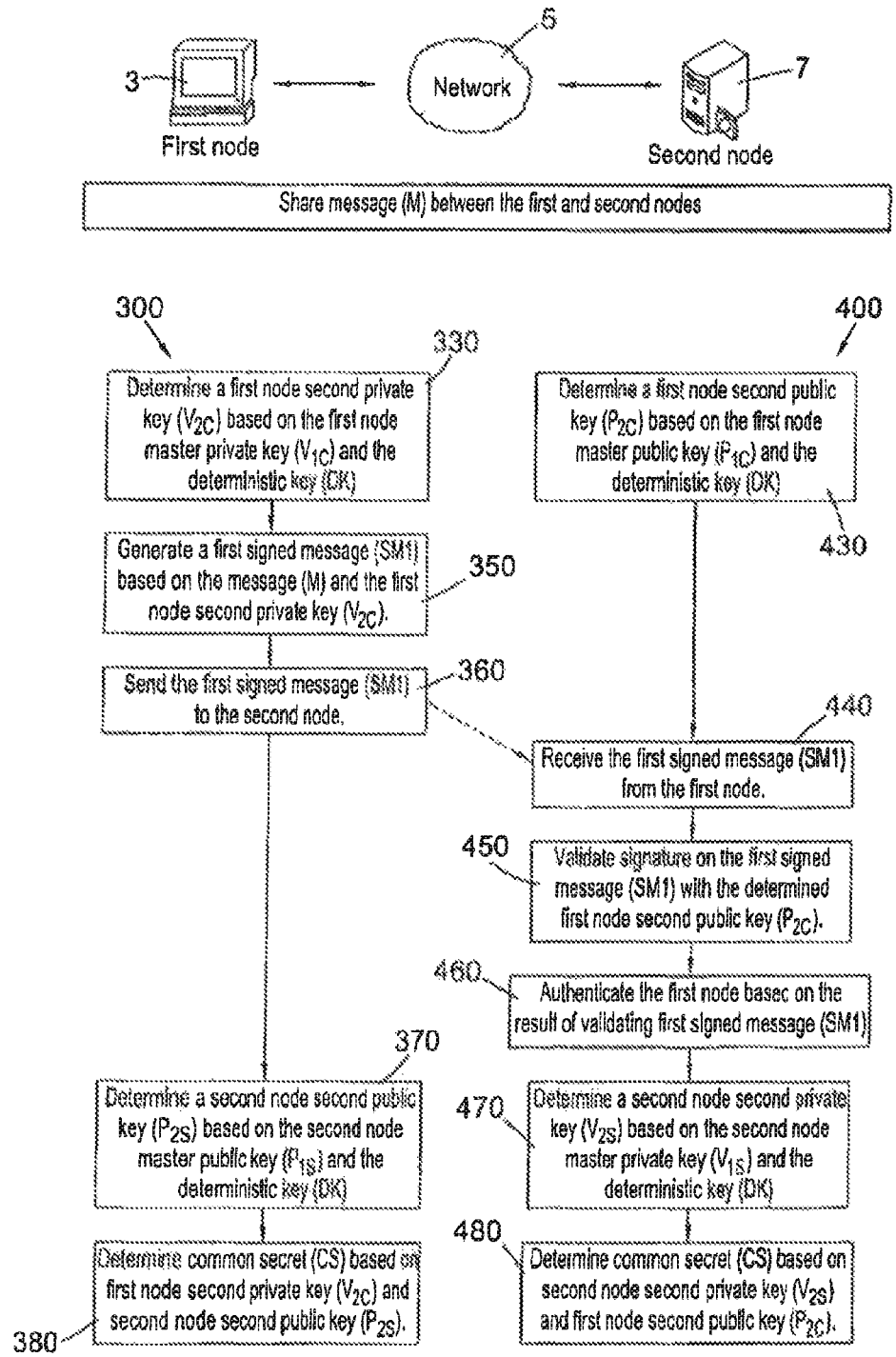
FIG. 2 is a flow chart of computer-implemented methods for determining a common secret.

Firstly, a method, device and system to determine a common secret (CS) at a first node (C) that is the same common secret at a second node (S) will now be described. This is used to determine a second common secret between a pair of nodes, which is then used to share a first common secret among a plurality of nodes comprising three or more nodes, as described in more detail below with reference to FIGS. 7 and 8. FIG. 1 illustrates a system 1 that includes a first node 3 that is in communication with, over a communications network 5, with a second node 7. The first node 3 has an associated first processing device 23 and the second node 5 has an associated second processing device 27. The first and second nodes 3, 7 may include an electronic device, such as a computer, tablet computer, mobile communication device, computer server etc. In one example, the first node 3 may be a client device and the second node 7 a server.

The first node 3 is associated with a first asymmetric cryptography pair having a first node master private key ($V_{1C}$) and a first node master public key ($P_{1C}$). The second node (7) is associated with a second asymmetric cryptography pair having a second node master private key ($V_{1S}$) and a second node master public key ($P_{1S}$). The first and second asymmetric cryptography pairs for the respective first and second nodes 3, 7 may be generated during registration. Methods of registration 100, 200 performed by the first and second nodes 3, 7 will be described in further detail below with reference to FIG. 3. The public key for each node may be shared publicly, such as over the communications network 5.

To determine the common secret (CS) at both the first node 3 and second node 7, the nodes 3, 7 perform steps of respective methods 300, 400 without communicating private keys over the communications network 5.

The method 300 performed by the first node 3 includes determining 330 a first node second private key ($V_{2C}$) based on at least the first node master private key ($V_{1C}$) and a deterministic key (DK). The deterministic key may be based on a message (M) that is a shared between the first and second nodes, which may include sharing the message over the communications network 5 as described in further detail below. The method 300 also includes determining 370 a second node second public key ($P_{2S}$) based on at least the second node master public key ($P_{1S}$) and the deterministic key (DK). The method 300 includes determining 380 the common secret (CS) based on the first node second private key ($V_{2C}$) and the second node second public key ($P_{2S}$).

Importantly, the same common secret (CS) can also be determined at the second node 7 by method 400. The method 400 determining 430 a first node second public key ($P_{2C}$) based on the first node master public key ($P_{1C}$) and the deterministic key (DK). The method 400 further includes determining 470 a second node second private key ($V_{2S}$) based on the second node master private key ($V_{1S}$) and the deterministic key (DK). The method 400 includes determining 480 the common secret (CS) based on the second node second private key ($V_{2S}$) and the first node second public key ($P_{2C}$).

The communications network 5, may include a local area network, a wide area network, cellular networks, radio communication network, the Internet, etc. These networks, where data may be transmitted via communications medium such as electrical wire, fibre optic, or wirelessly may be susceptible to eavesdropping, such as by an eavesdropper 11. The method 300, 400 may allow the first node 3 and second node 7 to both independently determine a common secret without transmitting the common secret over the communications network 5. Thus one advantage is that the common secret (CS) may be determined securely by each node without having to transmit a private key over a potentially unsecure communications network 5. In turn, the common secret may be used as a secret key (or as the basis of a secret key) for encrypted communication between the first and second nodes 3, 7 over the communications network 5.

The methods 300, 400 may include additional steps. The method 300 may include, at the first node 3, generating a signed message (SM1) based on the message (M) and the first node second private key ($V_{2C}$). The method 300 further includes sending 360 the first signed message (SM1), over the communications network, to the second node 7. In turn, the second node 7 may perform the steps of receiving 440 the first signed message (SM1). The method 400 also includes the step of validating 450 the first signed message (SM1) with the first node second public key ($P_{2C}$) and authenticating 460 the first node 3 based on the result of validating the first signed message (SM1). Advantageously, this allows the second node 7 to authenticate that the purported first node (where the first signed message was generated) is the first node 3. This is based on the assumption that only the first node 3 has access to the first node master private key ($V_{1C}$) and therefore only the first node 3 can determine the first node second private key ($V_{2C}$) for generating the first signed message (SM1). It is to be appreciated that similarly, a second signed message (SM2) can be generated at the second node 7 and sent to the first node 3 such that the first node 3 can authenticate the second node 7, such as in a peer-to-peer scenario.

Sharing the message (M) between the first and second nodes may be achieved in a variety of ways. In one example, the message may be generated at the first node 3 which is then sent, over the communications network 5, the second node 7. Alternatively, the message may be generated at the second node 7 and then sent, over the communications network 5, to the second node 7. In yet another example, the message may be generated at a third node 9 and the message sent to both the first and second nodes 3, 7. In yet another alternative, a user may enter the message through a user interface 15 to be received by the first and second nodes 3, 7. In yet another example, the message (M) may be retrieved from a data store 19 and sent to the first and second nodes 3, 7. In some examples, the message (M) may be public and therefore may be transmitted over an unsecure network 5.

In further examples, one or more messages (M) may be stored in a data store 13, 17, 19, where the message may be associated with a session, transaction, etc, between the first node 3 and the second node 7. Thus the messages (M) may be retrieved and used to recreate, at the respective first and second nodes 3, 7, the common secret (CS) associated with that session, or transaction. Advantageously, a record to allow recreation of the common secret (CS) may be kept without the record by itself having to be stored privately or transmitted securely. This may be advantageous if numerous transactions are performed at the first and second nodes 3, 7 and it would be impractical to store all the messages (M) at the nodes themselves.

Method of Registration 100, 200

Figure 3:
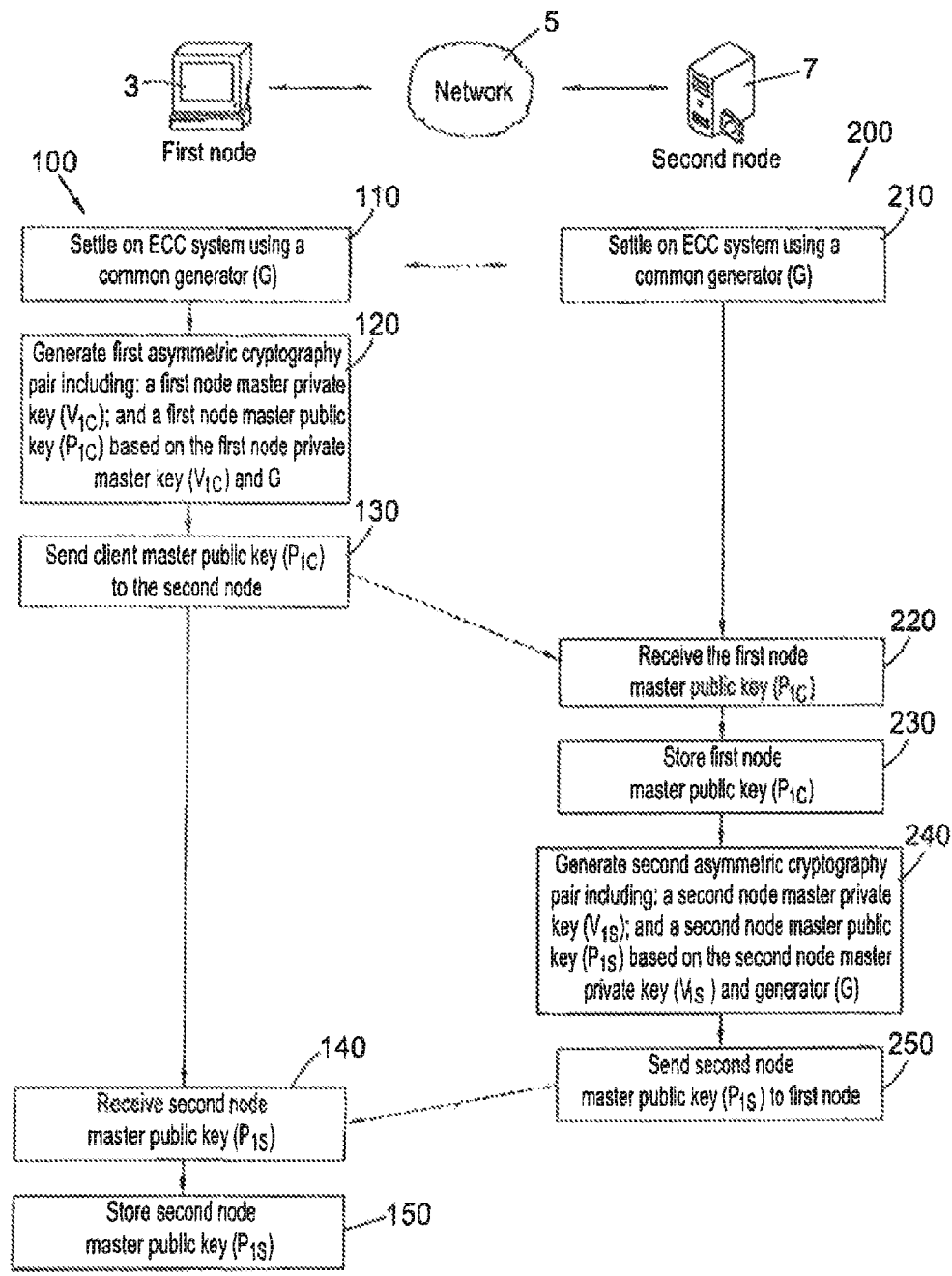
FIG. 3 is a flow chart of computer-implemented methods to register the first and second nodes.

An example of a method of registration 100, 200 will be described with reference to FIG. 3, where method 100 is performed by the first node 3 and method 200 is performed by the second node 7. This includes establishing the first and second asymmetric cryptography pairs for the respective first and second nodes 3, 7.

The asymmetric cryptography pairs include associated private and public keys, such as those used in public-key encryption. In this example, the asymmetric cryptography pairs are generated using Elliptic Curve Cryptography (ECC) and properties of elliptic curve operations.

Standards for ECC may include known standards such as those described by the Standards for Efficient Cryptography Group (www.sceg.org). Elliptic curve cryptography is also described in U.S. Pat. Nos. 5,600,725, 5,761,305, 5,889,865, 5,896,455, 5,933,504, 6,122,736, 6,141,420, 6,618,483, 6,704,870, 6,785,813, 6,078,667, 6,792,530.

In the method 100, 200, this includes the first and second nodes settling 110, 210 to a common ECC system and using a common generator (G). In one example, the common ECC system may be based on secp256K1 which is an ECC system used by Bitcoin. The common generator (G) may be selected, randomly generated, or assigned.

Turning now to the first node 3, the method 100 includes settling 110 on the common ECC system and common generator (G). This may include receiving the common ECC system and common generator from the second node 7, or a third node 9. Alternatively, a user interface 15 may be associated with the first node 3, whereby a user may selectively provide the common ECC system and/or common generator (G). In yet another alternative one or both of the common ECC system and/or common generator (G) may be randomly selected by the first node 3. The first node 3 may send, over the communications network 5, a notice indicative of using the common ECC system with a common generator (G) to the second node 7. In turn, the second node 7 may settle 210 by sending a notice indicative of an acknowledgment to using the common ECC system and common generator (G).

The method 100 also includes the first node 3 generating 120 a first asymmetric cryptography pair that includes the first node master private key ($V_{1C}$) and the first node master public key ($P_{1C}$). This includes generating the first node master private key ($V_{1C}$) based, at least in part, on a random integer in an allowable range specified in the common ECC system. This also includes determining the first node master public key ($P_{1C}$) based on elliptic curve point multiplication of the first node master private key ($V_{1C}$) and the common generator (G) according to the formula:

$$P_{1C}=V_{1C} \times G \qquad \text{(Equation 1)}$$

Thus the first asymmetric cryptography pair includes:

$V_{1C}$: The first node master private key that is kept secret by the first node.

$P_{1C}$: The first node master public key that is made publicly known.

The first node 3 may store the first node master private key ($V_{1C}$) and the first node master public key ($P_{1C}$) in a first data store 13 associated with the first node 3. For security, the first node master private key ($V_{1C}$) may be stored in a secure portion of the first data store 13 to ensure the key remains private.

The method 100 further includes sending 130 the first node master public key ($P_{1C}$), over the communications network 5, to the second node 7. The second node 7 may, on receiving 220 the first node master public key ($P_{1C}$), store 230 the first node master public key ($P_{1C}$) in a second data store 17 associated with the second node 7.

Similar to the first node 3, the method 200 of the second node 7 includes generating 240 a second asymmetric cryptography pair that includes the second node master private key ($V_{1S}$) and the second node master public key ($P_{1S}$). The second node master private key ($V_{1S}$) is also a random integer within the allowable range. In turn, the second node master public key ($P_{1S}$) is determined by the following formula:

$$P_{1S}=V_{1S} \times G \qquad \text{(Equation 2)}$$

Thus the second asymmetric cryptography pair includes:

$V_{1S}$: The second node master private key that is kept secret by the second node.

$P_{1S}$: The second node master public key that is made publicly known.

The second node 7 may store the second asymmetric cryptography pair in the second data store 17. The method 200 further includes sending 250 the second node master public key ($P_{1S}$) to the first node 3. In turn, the first node 3 may receive 140 and stores 150 the second node master public key ($P_{1S}$).

It is to be appreciated that in some alternatives, the respective public master keys may be received and stored at a third data store 19 associate with the third node 9 (such as a trusted third party). This may include a third party that acts as a public directory, such as a certification authority. Thus in some examples, the first node master public key ($P_{1C}$) may requested and received by the second node 7 only when determining the common secret (CS) is required (and vice versa).

The registration steps may only need to occur once as an initial setup. Afterwards, the master keys can be reused in a secure matter to generate common secret(s) that are dependent, inter alia, on the deterministic key (DK).

Session Initiation and Determining the Common Secret by the First Node 3

Figure 4:
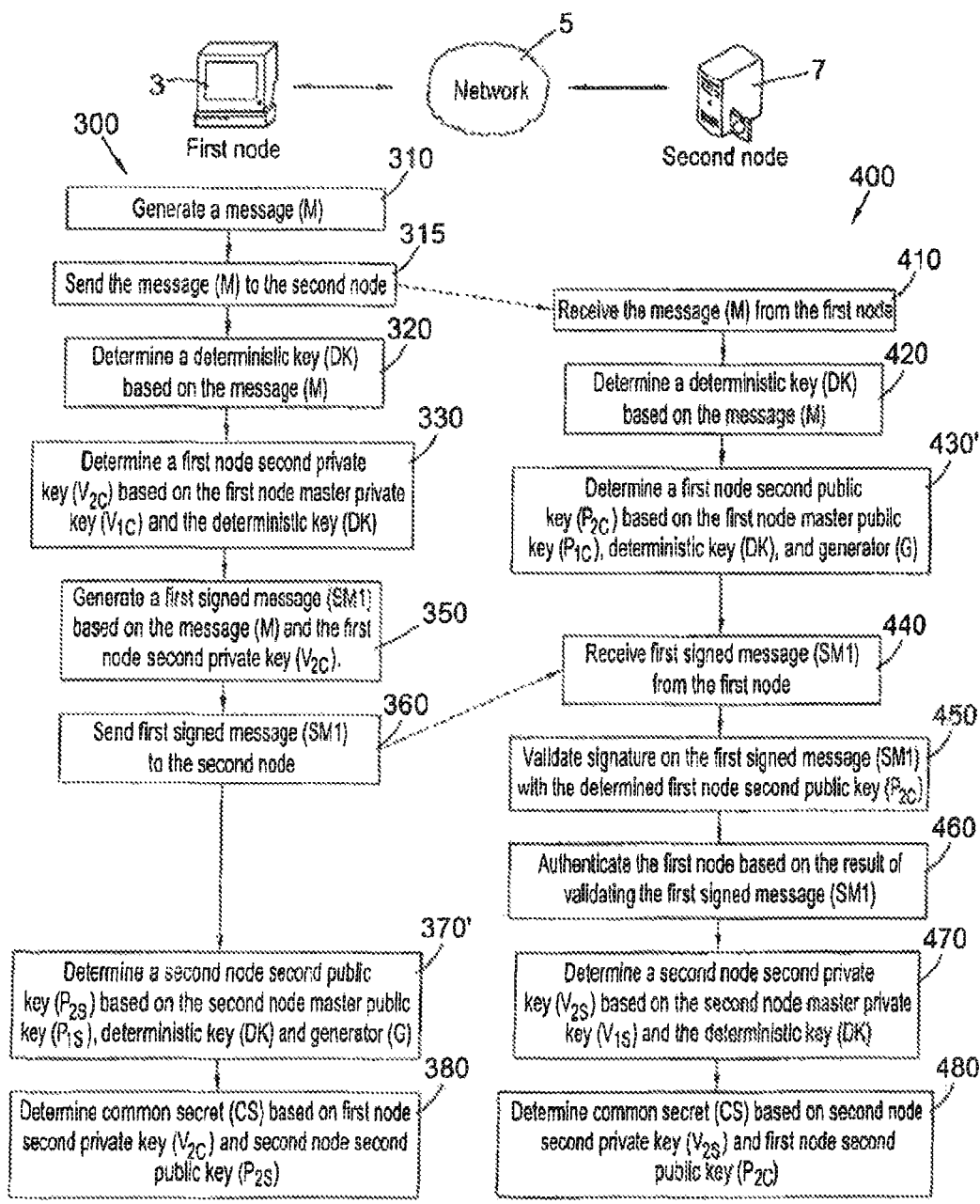
FIG. 4 is another flow chart of computer-implemented methods for determining a common secret.
Figure 5:
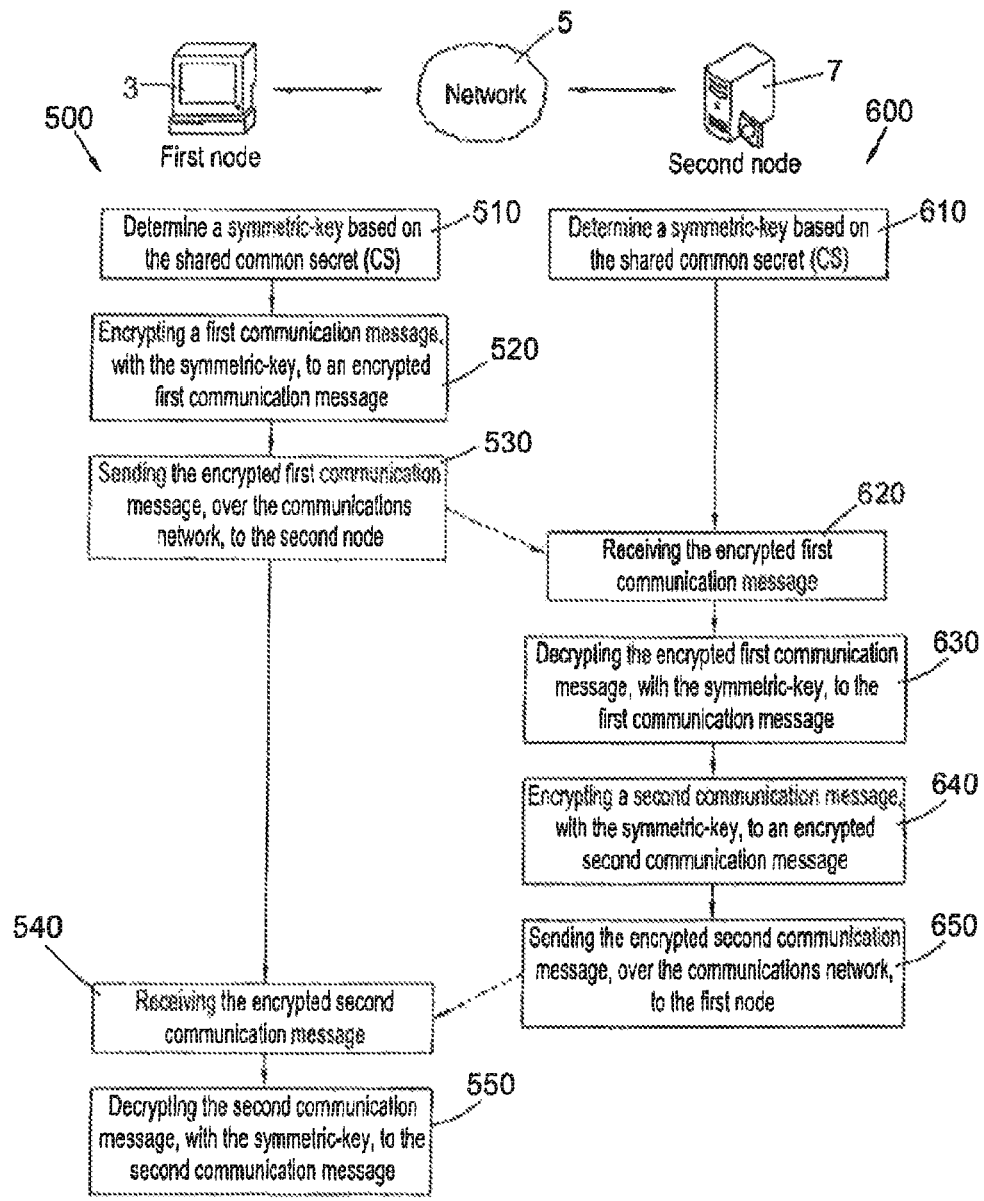
FIG. 5 is a flow chart of computer-implemented methods of secure communication between the first node and second node.

An example of determining a common secret (CS) will now be described with reference to FIG. 4. The common secret (CS) may be used for a particular session, time, transaction, or other purpose between the first node 3 and the second node 7 and it may not be desirable, or secure, to use the same common secret (CS). Thus the common secret (CS) may be changed between different sessions, time, transactions, etc.

Generating a Message (M) 310

In this example, the method 300 performed by the first node 3 includes generating 310 a message (M). The message (M) may be random, pseudo random, or user defined. In one example, the message (M) is based on Unix time and a nonce (and arbitrary value). For example, the message (M) may be provided as:

$$\text{Message }(M)=\text{UnixTime}+\text{nonce} \qquad \text{(Equation 3)}$$

In some examples, the message (M) is arbitrary. However it is to be appreciated that the message (M) may have selective values (such as Unix Time, etc) that may be useful in some applications.

The method 300 includes sending 315 the message (M), over the communications network 3, to the second node 7. The message (M) may be sent over an unsecure network as the message (M) does not include information on the private keys.

Determining a Deterministic Key 320

The method 300 further includes the step of determining 320 a deterministic key (DK) based on the message (M). In this example, this includes determining a cryptographic hash of the message. An example of a cryptographic hash algorithm includes SHA-256 to create a 256-bit deterministic key (DK). That is:

$$DK=\text{SHA-256}(M) \qquad \text{(Equation 4)}$$

It is to be appreciated that other hash algorithms may be used. This may include other has algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zemor-Tillich hash function and knapsack-based hash functions.

Determining a First Node Second Private Key 330

The method 300 then includes the step 330 of determining 330 the first node second private key ($V_{2C}$) based on the second node master private key ($V_{1C}$) and the deterministic key (DK). This can be based on a scalar addition of the first node master private key ($V_{1C}$) and the deterministic key (DK) according to the following formula:

$$V_{2C}=V_{1C}+DK \qquad \text{(Equation 5)}$$

Thus the first node second private key ($V_{2C}$) is not a random value but is instead deterministically derived from the first node master private key. The corresponding public key in the cryptographic pair, namely the first node second public key ($P_{2C}$), has the following relationship:

$$P_{2C}=V_{2C} \times G \qquad \text{(Equation 6)}$$

Substitution of $V_{2C}$ from Equation 5 into Equation 6 provides:

$$P_{2C}=(V_{1C}+DK) \times G \qquad \text{(Equation 7)}$$

Where the '+' operator refers to scalar addition and the 'x' operator refers to elliptic curve point multiplication. Noting that elliptic curve cryptography algebra is distributive, Equation 7 may be expressed as:

$$P_{2C}=V_{1C} \times G+DK \times G \qquad \text{(Equation 8)}$$

Finally, Equation 1 may be substituted into Equation 7 to provide:

$$P_{2C}=P_{1C}+DK\times G \quad \text{(Equation 9.1)}$$

$$P_{2C}=P_{1C}+SHA\text{-}256(M)\times G \quad \text{(Equation 9.2)}$$

In equations 8 to 9.2, the '+' operator refers to elliptic curve point addition. Thus the corresponding first node second public key ($P_{2C}$) can be derivable given knowledge of the first node master public key ($P_{1C}$) and the message (M). The second node 7 may have such knowledge to independently determine the first node second public key ($P_{2C}$) as will be discussed in further detail below with respect to the method 400.

Generate a First Signed Message (SM1) Based on the Message and the First Node Second Private Key 350

The method 300 further includes generating 350 a first signed message (SM1) based on the message (M) and the determined first node second private key ($V_{2C}$). Generating a signed message includes applying a digital signature algorithm to digitally sign the message (M). In one example, this includes applying the first node second private key ($V_{2C}$) to the message in an Elliptic Curve Digital Signature Algorithm (ECDSA) to obtain the first signed message (SM1).

Examples of ECDSA include those based on ECC systems with secp256k1, secp256r1, secp384r1, se3cp521r1.

The first signed message (SM1) can be verified with the corresponding first node second public key ($P_{2C}$) at the second node 7. This verification of the first signed message (SM1) may be used by the second node 7 to authenticate the first node 3, which will be discussed in the method 400 below.

Determine a Second Node Second Public Key 370'

The first node 3 may then determine 370 a second node second public key ($P_{2S}$). As discussed above, the second node second public key ($P_{2S}$) may be based at least on the second node master public key ($P_{1S}$) and the deterministic key (DK). In this example, since the public key is determined 370' as the private key with elliptic curve point multiplication with the generator (G), the second node second public key ($P_{2S}$) can be expressed, in a fashion similar to Equation 6, as:

$$P_{2S}=V_{2S}\times G \quad \text{(Equation 10.1)}$$

$$P_{2S}=P_{1S}+DK\times G \quad \text{(Equation 10.2)}$$

The mathematical proof for Equation 10.2 is the same as described above for deriving Equation 9.1 for the first node second public key ($P_{2C}$). It is to be appreciated that the first node 3 can determine 370 the second node second public key independently of the second node 7.

Determine the Common Secret 380 at the First Node 3

The first node 3 may then determine 380 the common secret (CS) based on the determined first node second private key ($V_{2C}$) and the determined second node second public key ($P_{2S}$). The common secret (CS) may be determined by the first node 3 by the following formula:

$$S=V_{2C}\times P_{2S} \quad \text{(Equation 11)}$$

Method 400 Performed at the Second Node 7

The corresponding method 400 performed at the second node 7 will now be described. It is to be appreciated that some of these steps are similar to those discussed above that were performed by the first node 3.

The method 400 includes receiving 410 the message (M), over the communications network 5, from the first node 3. This may include the message (M) sent by the first node 3 at step 315. The second node 7 then determines 420 a deterministic key (DK) based on the message (M). The step of determining 420 the deterministic key (DK) by the second node 7 is similar to the step 320 performed by the first node described above. In this example, the second node 7 performs this determining step 420 independent of the first node 3.

The next step includes determining 430 a first node second public key ($P_{2C}$) based on the first node master public key ($P_{1C}$) and the deterministic key (DK). In this example, since the public key is determined 430' as the private key with elliptic curve point multiplication with the generator (G), the first node second public key ($P_{2C}$) can be expressed, in a fashion similar to Equation 9, as:

$$P_{2C}=V_{2C}\times G \quad \text{(Equation 12.1)}$$

$$P_{2C}=P_{1C}+DK\times G \quad \text{(Equation 12.2)}$$

The mathematical proof for Equations 12.1 and 12.2 is the same as those discussed above for Equations 10.1 and 10.2.

The Second Node 7 Authenticating the First Node 3

The method 400 may include steps performed by the second node 7 to authenticate that the alleged first node 3, is the first node 3. As discussed previously, this includes receiving 440 the first signed message (SM1) from the first node 3. The second node 7 may then validate 450 the signature on the first signed message (SM1) with the first node second public key ($P_{2C}$) that was determined at step 430.

Verifying the digital signature may be done in accordance with an Elliptic Curve Digital Signature Algorithm (ECDSA) as discussed above. Importantly, the first signed message (SM1) that was signed with the first node second private key ($V_{2C}$) should only be correctly verified with the corresponding first node second public key ($P_{2C}$), since $V_{2C}$ and $P_{2C}$ form a cryptographic pair. Since these keys are deterministic on the first node master private key ($V_{1C}$) and the first node master public key ($P_{1C}$) that were generated at registration of the first node 3, verifying first signed message (SM1) can be used as a basis of authenticating that an alleged first node sending the first signed message (SM1) is the same first node 3 during registration. Thus the second node 7 may further perform the step of authenticating (460) the first node 3 based on the result of validating (450) the first signed message.

The above authentication may be suitable for scenarios where one of the two nodes are a trusted node and only one of the nodes need to be authenticated. For example, the first node 3 may be a client and the second node 7 may be a server trusted by the client. Thus the server (second node 7) may need to authenticate the credentials of the client (first node 3) in order to allow the client access to the server system. It may not be necessary for the server to be authenticate the credentials of the server to the client. However in some scenarios, it may be desirable for both nodes to be authenticated to each other, such as in a peer-to-peer scenario that will be described in another example below.

The Second Node 7 Determining the Common Secret

The method 400 may further include the second node 7 determining 470 a second node second private key ($V_{2S}$) based on the second node master private key ($V_{1S}$) and the deterministic key (DK). Similar to step 330 performed by the first node 3, the second node second private key ($V_{2S}$) can be based on a scalar addition of the second node master private key ($V_{1S}$) and the deterministic key (DK) according to the following formulas:

$$V_{2S} = V_{1S} + DK \quad \text{(Equation 13.1)}$$

$$V_{2S} = V_{1S} + \text{SHA-256}(M) \quad \text{(Equation 13.2)}$$

The second node 7 may then, independent of the first node 3, determine 480 the common secret (CS) based on the second node second private key ($V_{2S}$) and the first node second public key ($P_{2C}$) based on the following formula:

$$S = V_{2S} \times P_{1C} \quad \text{(Equation 14)}$$

Proof of the Common Secret (CS) Determined by the First Node 3 and Second Node 7

The common secret (CS) determined by the first node 3 is the same as the common secret (CS) determined at the second node 7. Mathematical proof that Equation 11 and Equation 14 provide the same common secret (CS) will now be described.

Turning to the common secret (CS) determined by the first node 3, Equation 10.1 can be substituted into Equation 11 as follows:

$$S = V_{2C} \times P_{2S} \quad \text{(Equation 11)}$$

$$S = V_{2C} \times (V_{2S} \times G)$$

$$S = (V_{2C} \times V_{2S}) \times G \quad \text{(Equation 15)}$$

Turning to the common secret (CS) determined by the second node 7, Equation 12.1 can be substituted into Equation 14 as follows:

$$S = V_{2S} \times P_{2C} \quad \text{(Equation 14)}$$

$$S = V_{2S} \times (V_{2C} \times G)$$

$$S = (V_{2S} \times V_{2C}) \times G \quad \text{(Equation 16)}$$

Since ECC algebra is commutative, Equation 15 and Equation 16 are equivalent, since:

$$S = (V_{2C} \times V_{2S}) \times G = (V_{2S} \times V_{2C}) \times G \quad \text{(Equation 17)}$$

The Common Secret (CS) and Secret Key

The common secret (CS) may be used as a secret key, or as the basis of a secret key in a symmetric-key algorithm for secure communication between the first node 3 and second node 7.

The common secret (CS) may be in the form of an elliptic curve point ($x_S$, $y_S$). This may be converted into a standard key format using standard publicly known operations agreed by the nodes 3, 7. For example, the $x_S$ value may be a 256-bit integer that could be used as a key for $AES_{256}$ encryption. It could also be converted into a 160-bit integer using RIPEMD160 for any applications requiring this length key.

The common secret (CS) may be determined as required. Importantly, the first node 3 does not need to store the common secret (CS) as this can be re-determined based on the message (M). In some examples, the message(s) (M) used may be stored in data store 13, 17, 19 (or other data store) without the same level of security as required for the master private keys. In some examples, the message (M) may be publicly available.

However depending on some applications, the common secret (CS) could be stored in the first data store (X) associated with the first node provided the common secret (CS) is kept as secure as the first node master private key ($V_{1C}$).

Furthermore, the disclosed system may allow determination of multiple common secrets that may correspond to multiple secure secret keys based on a single master key cryptography pair. An advantage of this may be illustrated by the following example.

In situations where there are multiple sessions, each associated with multiple respective common secrets (CS), it may be desirable to have a record associated with those multiple sessions so that the respective common secrets (CS) can be re-determined for the future. In known systems, this may have required multiple secret keys to be stored in a secure data store, which may be expensive or inconvenient to maintain. In contrast, the present system has the master private keys kept secure at the respective first and second nodes, whilst the other deterministic keys, or message (M), may be stored either securely or insecurely. Despite the deterministic keys (DK, or message (M), being stored insecurely, the multiple common secrets (CS) are kept secure since the master private keys required to determine the common secrets are still secure.

The method may also be used for generating "session keys" for temporary communication links, such as for securely transmitting login passwords.

Peer-to Peer Authentication

Figure 6:
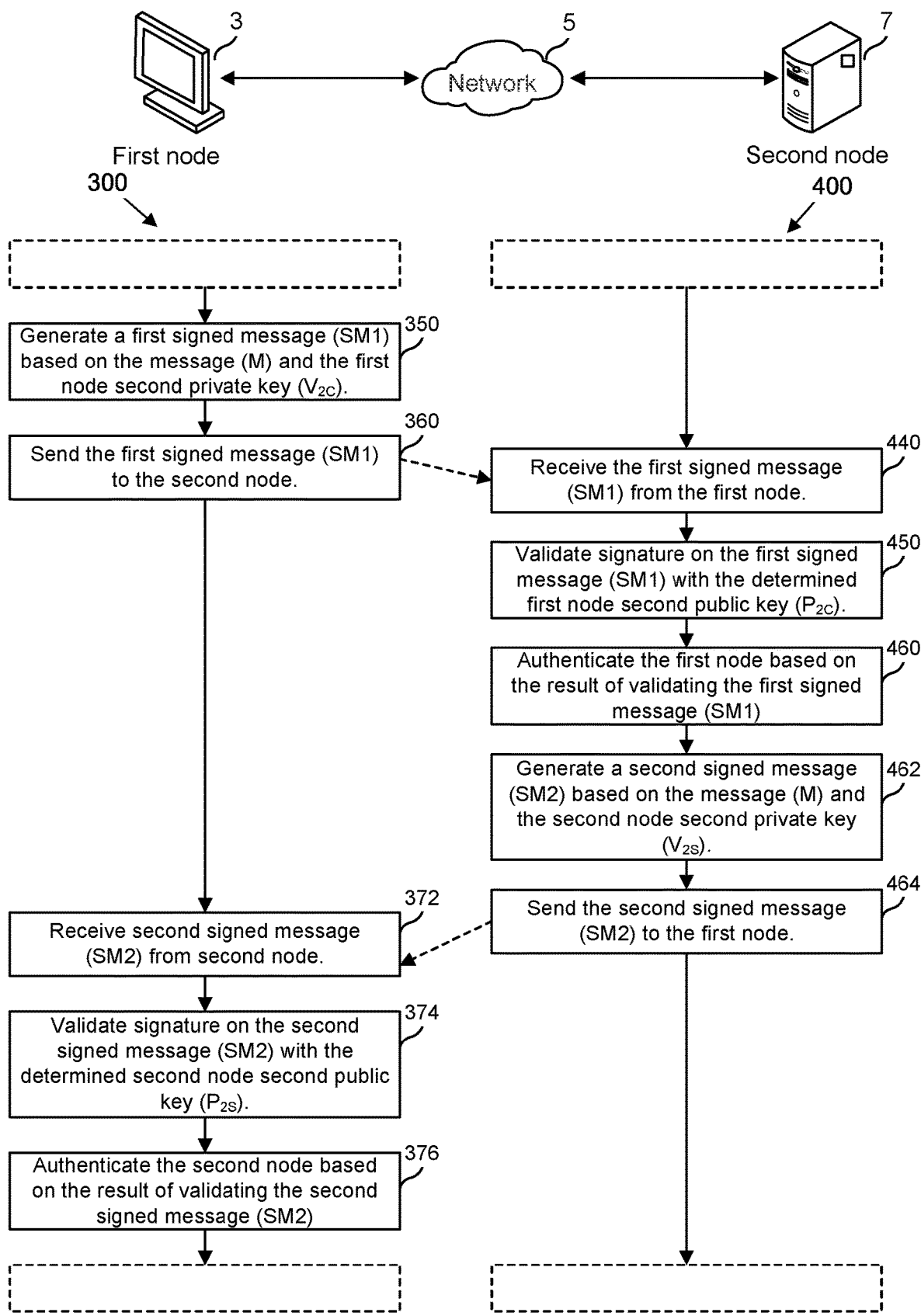
FIG. 6 is a flow chart of computer implemented methods to authenticate the first node and the second node.

In a peer-to-peer scenario, the first node 3 and the second node 7 may need to authenticate the credentials of one another. An example of this will now be described with reference to FIG. 6. In this example, the method 300, 400 steps to authenticate the first node 3 based on the validated first signed message (SM1) are similar to those discussed above.

However, the method 400 performed by the second node 7 further includes generating 462 a second signed message (SM2) based on the message (M) and the second node private key ($V_{2S}$). In some alternatives, the second signed message (SM2) may be based on a second message (M2) and the second node private key ($V_{2S}$), where the second message (M2) is shared with the first node 3. The method 400 further includes sending 464 the second signed message (SM2), over the communications network 5, to the first node 3.

At the first node 3, the method 300 includes receiving the second signed message (SM2) from the second node 7. The method includes validating 374 the signature on the second signed message (SM2) with the second node second public key ($P_{2S}$) that was determined at step 370. The method 300 may then include authenticating 376 the second node 7 based on the result of validating the second signed message (SM2). This results in the first and second nodes 3, 7 authenticating one another.

Hierarchy of Deterministic Keys

In one example, a series of successive deterministic keys may be determined, where each successive key may be determined based on the preceding deterministic key.

For example, instead of repeating steps 310 to 370 and 410 to 470 to generate successive single-purpose keys, by prior agreement between the nodes, the previously used deterministic key (DK) can be rehashed repeatedly by both parties to establish a hierarchy of deterministic keys. In effect, the deterministic key, based on the hash of a message (M), can be a next generation message (M') for the next generation of deterministic key (DK'). Doing this allows successive generations of shared secrets to be calculated without the need for further protocol-establishment transmissions, in particular transmission of multiple messages for each generation of common secrets. The next generation common secret (CS') can be computed as follows.

Firstly, both the first node 3 and the second node 7 independently determine the next generation of the deterministic key (DK'). This is similar to steps 320 and 420 but adapted with the following formulas:

$$M'=\text{SHA-256}(M) \qquad \text{(Equation 18)}$$

$$DK'=\text{SHA-256}(M') \qquad \text{(Equation 19.1)}$$

$$DK'=\text{SHA-256}(\text{SHA-256}(M)) \qquad \text{(Equation 19.2)}$$

The first node 3 may then determine the next generation of the second node second public key ($P_{2S}'$) and the first node second private key ($V_{2C}'$) similar to steps 370 and 330 described above, but adapted with the following formulas:

$$P_{2S}'=P_{1S}+DK'\times G \qquad \text{(Equation 20.1)}$$

$$V_{2C}'=V_{1C}+DK' \qquad \text{(Equation 20.2)}$$

The second node 7 may then determine the next generation of the first node second public key ($P_{2C}'$) and the second node second private key ($V_{2S}'$) similar to steps 430 and 470 described above, but adapted with the following formulas:

$$P_{2C}'=P_{1C}+DK'\times G \qquad \text{(Equation 21.1)}$$

$$V_{2S}'=V_{1S}+DK' \qquad \text{(Equation 21.2)}$$

The first node 3 and the second node 7 may then each determine the next generation common secret (CS').

In particular, the first node 3 determines the next generation common secret (CS') with the formula:

$$CS'=V_{2C}'\times P_{2S}' \qquad \text{(Equation 22)}$$

The second node 7 determines the next generation common secret (CS') with the formula:

$$CS'=V_{2S}'\times P_{2C}' \qquad \text{(Equation 23)}$$

Further generations (CS", CS''', etc.) can be calculated in the same way to create a chain hierarchy. This technique requires that both the first node 3 and the second node 7 keep track of the original Message (M) or the originally calculated deterministic key (DK), and to which node it relates. As this is publicly known information there are no security issues regarding the retention of this information. Accordingly, this information might be kept on 'hash tables' (linking hash values to public keys) and distributed freely across the network 5 (for example using Torrent). Furthermore, if any individual common secret (CS) in the hierarchy is ever compromised, this does not affect the security of any other common secrets in the hierarchy provided the private keys $V_{1C}$, $V_{1S}$ remain secure.

Tree Structure of Keys

As well as a chain (linear) hierarchy as described above, a hierarchy in the form of a tree structure can be created.

With a tree structure, a variety of keys for different purposes such as authentication keys, encryption keys, signing keys, payment keys, etc. may be determined whereby these keys are all linked to a single securely maintained master key.

DESCRIPTION OF EMBODIMENTS

Figure 7:
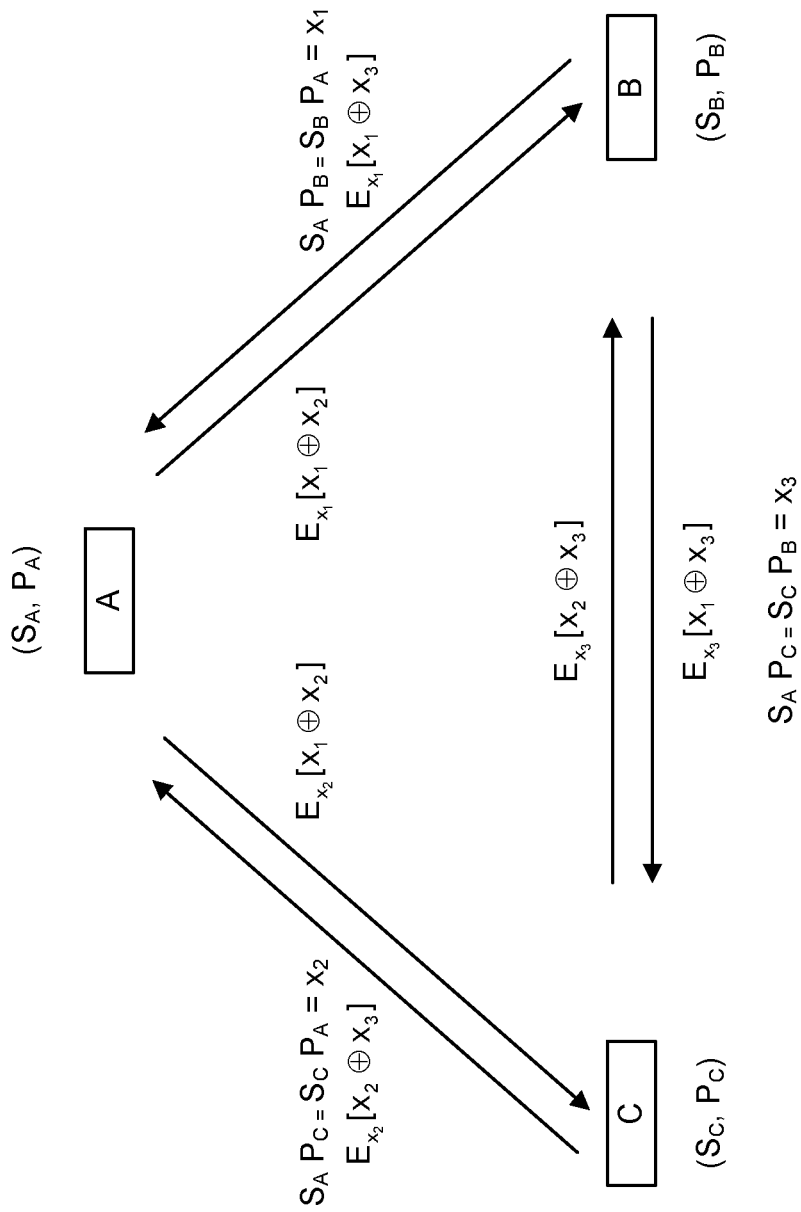
FIG. 7 is a diagram showing a method embodying the present disclosure for sharing a common secret between three nodes.
Figure 8:
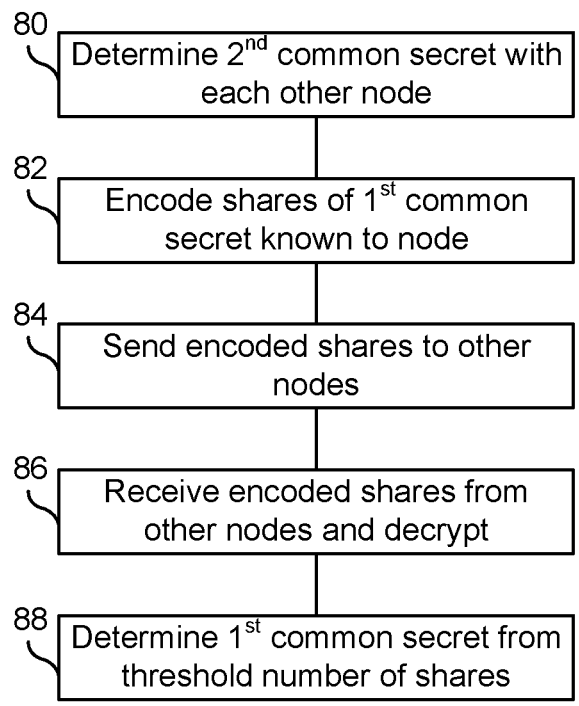
FIG. 8 is a flow chart of the method of FIG. 7.

FIG. 7 shows a method embodying the present disclosure for sharing a first common secret among three nodes A, B and C, and a flowchart of the method is shown in FIG. 8. Each node A, B, C is associated with its own private key/public key pair (S, P), the private, public key pair of node A, for example, being ($S_A$,$P_A$). Each private or public key may be derived from a respective master private key or master public key for that node and a deterministic key, in a manner similar to that described above with reference to FIGS. 1 to 6. The private-public key pairs are key pairs of an elliptic curve cryptography system where, for example, $P_A=S_A\times G$, where G is the elliptic curve generator point.

Secure communication between each pair of nodes A,B, A,C and B,C is established by determining a second common secret between each pair of nodes using a method as described above with reference to FIGS. 1 to 6, in step 80 of FIG. 8. In the arrangement shown in FIG. 7, the following relations apply:

$$S_A P_B = S_A S_B G = S_B S_A G = S_B P_A = x_1$$

Similarly, $S_A P_C = S_C P_A = x_2$

And $S_B P_C = S_C P_B = x_3$

The first common secret to be shared among the nodes A, B, C is $x_1 \oplus x_2 \oplus x_3$, where $\oplus$ denotes XOR operation.

Once a secure communication channel has been established between each pair of nodes, each node encrypts shares of the first secret, in the form of combinations of the second secrets known to that node, using private-public key pairs based on those second secrets in step 82 of FIG. 8. This is done by each node encoding XOR combinations of pairs of the second common secrets x known to that node. Accordingly for node A, common secrets $x_1$ and $x_2$ are known to node A, so node A computes the combination $x_1 \oplus x_2$, and then separately encodes this combination on the basis of the private key of the private-public key pair of its respective communication channel $x_1$ or $x_2$ with each other node. Node A then sends the combination $x_1 \oplus x_2$, encrypted on the basis of $x_1$, to node B, and encrypted on the basis of $x_2$, to node C in step 84 of FIG. 8. These encrypted shares are represented by $E_{x1}[x_1 \oplus x_2]$ and $E_{x2}[x_1 \oplus x_2]$ respectively.

Similarly, common secrets $x_1$ and $x_3$ are known to node B, where $x_3$ represents a third common secret, common to second node B and third node C. Node B computes the combination $x_1 \oplus x_3$, and then separately encodes this combination on the basis of second common secrets $x_1$ and $x_3$ with each other node. Node B then sends $E_{x1}[x_1 \oplus x_3]$, the combination $x_1 \oplus x_3$, encrypted on the basis of $x_1$, to node A, and $E_{x3}[x_1 \oplus x_3]$ encrypted on the basis of $x_3$, to node C in step 84 of FIG. 8. Node C in turn computes the combination $x_2 \oplus x_3$, and then separately encodes this combination on the basis of second common secrets $x_2$ and $x_3$ with each other node. Node C then sends $E_{x2}[x_2 \oplus x_3]$, the combination $x_2 \oplus x_3$, encrypted on the basis of $x_2$, to node A, and $E_{x3}[x_2 \oplus x_3]$ encrypted on the basis of $x_3$, to node B in step 84 of FIG. 8.

Each of the nodes A, B, C receives the encrypted shares from the other nodes and decrypts the encrypted shares in step 86 of FIG. 8. As a result, each of the nodes can obtain the threshold number of shares necessary to reconstruct the first shared secret $x_1 \oplus x_2 \oplus x_3$ as follows.

Node A receives the share $x_2 \oplus x_3$ from node B and $x_1 \oplus x_3$ from node C. Since node A knows $x_1$ and $x_2$ separately, it can easily compute the first common secret $x_1 \oplus x_2 \oplus x_3$ by XOR combination of $x_1$ with $x_2 \oplus x_3$ or $x_2$ with $x_1 \oplus x_3$ in step 88 of FIG. 8. Similarly, node B receives the share $x_1 \oplus x_2$ from node A and $x_2 \oplus x_3$ from node C. Since node B knows $x_1$ and $x_3$ separately, it can easily compute the first common secret $x_1 \oplus x_2 \oplus x_3$ by XOR combination of $x_1$ with $x_2 \oplus x_3$ or $x_3$ with $x_2 \oplus x_3$ Also, node C receives the share $x_1 \oplus x_3$ from node B and $x_1 \oplus x_2$ from node A. Since node C knows $x_2$ and $x_3$ separately, it can easily compute the first common secret $x_1 \oplus x_2 \oplus x_3$ by XOR combination of $x_2$ with $x_1 \oplus x_3$ or $x_3$ with $x_1 \oplus x_2$.

Similarly to the manner described for the second common secrets above, the first common secret (CS) may be in the form of an elliptic curve point $(x_S, y_S)$. This may be converted into a standard key format using standard publicly known operations agreed by the nodes 3, 7. For example, the $x_S$ value may be a 256-bit integer that could be used as a key for $AES_{256}$ encryption. It could also be converted into a 160-bit integer using RIPEMD160 for any applications requiring this length key.

It is possible to distribute shares of the first common secret by other means than XOR encryption, although XOR encryption provides the advantage of obscuring the second common secrets when broadcast in scripts of blockchain transactions, so that it is not possible for third parties to determine the second common secrets without knowledge of a threshold number of other second common secrets. For example, simple arithmetic multiplication of the second common secrets of the form $(x_1.x_2.x_3)$ mod n can be used, where n is the order of the elliptic curve cryptography system used.

Figure 9:
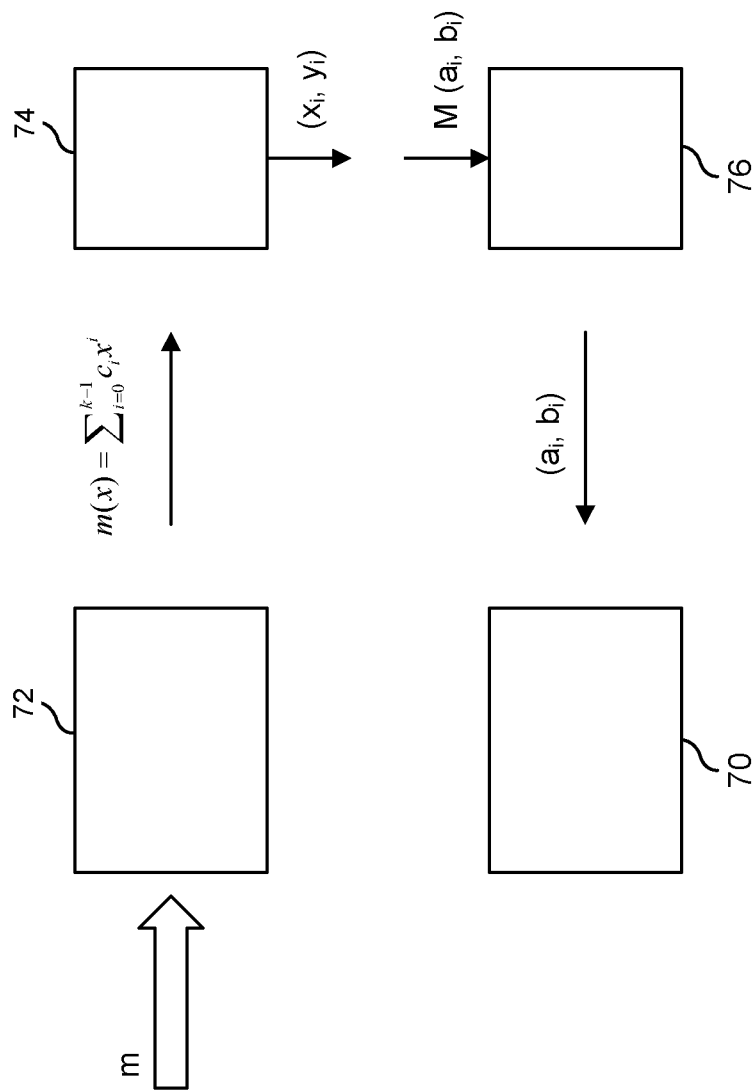
FIG. 9 shows a Berlekamp-Welch decoder for recovering a first common secret in a method embodying the present disclosure.

In addition, the shares of the first common secret can be distributed as shares of a polynomial function using a Shamir secret sharing scheme or a dealerless secret sharing scheme as will be familiar to persons skilled in the art. In the case in which the shares of the first common secret are shares of a polynomial function, efficient recovery of the first common secret can be carried out by means of a Berlekamp-Welch decoder as shown in FIG. 9. Referring to FIG. 9, the Berlekamp-Welch decoder 70 carries out polynomial interpolation of shares of a polynomial function to obtain the polynomial function.

In conventional use of the Berlekamp-Welch algorithm for correcting errors in transmitted data, a message m is divided into a series of k bytes at an encoder 72, and each byte $c_0, c_1, \ldots c_{k-1}$ is encoded as an integer modulo p. The message is then represented by a polynomial function:

$$m(x) = \sum_{i=0}^{k-1} c_i x^i$$

The value of polynomial function m(x) is then determined for a number of known values of x to generate a series of (x, y) pairs, which are then transmitted by a transmitter 74 to a receiver 76.

The data M received at the receiver 76 (i.e. the received message) comprises pairs $(a_1, b_1, \ldots a_n, b_n)$ corresponding to points on the polynomial function representing the original message $$P(x) = m(x) = \sum_{i=0}^{k-1} c_i x^i$$

If it is assumed that some of the transmitted (x, y) pairs have been corrupted during transmission, then an error locator polynomial function can be defined as follows:

$E(a_i) = 0$, when $P(a_i) \neq b_i$; otherwise $E(a_i) \neq 0$

If a product polynomial function $Q(a_i)$ is defined as $Q(a_i) = b_i E(a_i)$

Then for each received $(a_i, b_i)$ pair, regardless of whether the value of $b_i$ has become has been corrupted $Q(a_i) = b_i E(a_i) = P(a_i) E(a_i)$, since $E(a_i) = 0$, when $P(a_i) \neq b_i$ For n known values of $(a_i, b_i)$, since $E(a_i)$ is a polynomial function of degree e, and $P(a_i)$ is a polynomial function of degree (k−1), then $Q(a_i)$ is a polynomial function of degree (e+k−1). The known values of $(a_i, b_i)$ can therefore be expressed as the linear system:

$$Q(a_i) = \sum_{j=0}^{e+k-1} q_i a_i^j = b_i \sum_{j=0}^{e} e_j a_i^j = b_i E_i(a_i)$$

The linear system contains 2e+k−1 unknown terms (e from E(x) and e+k−1 from Q(x)), as a result of which the coefficients of $Q(a_i)$ and $E(a_i)$ can be determined if n≥2e+k−1. If $Q(a_i)$ and $E(a_i)$ can be determined, it is possible to determine $P(a_i)$ to recover the original message m(x).

It can therefore be seen that the Berlekamp-Welch decoder 70 receives as inputs pairs representing points on a polynomial function, and outputs the polynomial function. The decoder 70 can therefore be used as a replacement for Lagrange interpolation in the present disclosure to determine a polynomial function from a threshold number of shares represented by that polynomial function.

Figure 10:
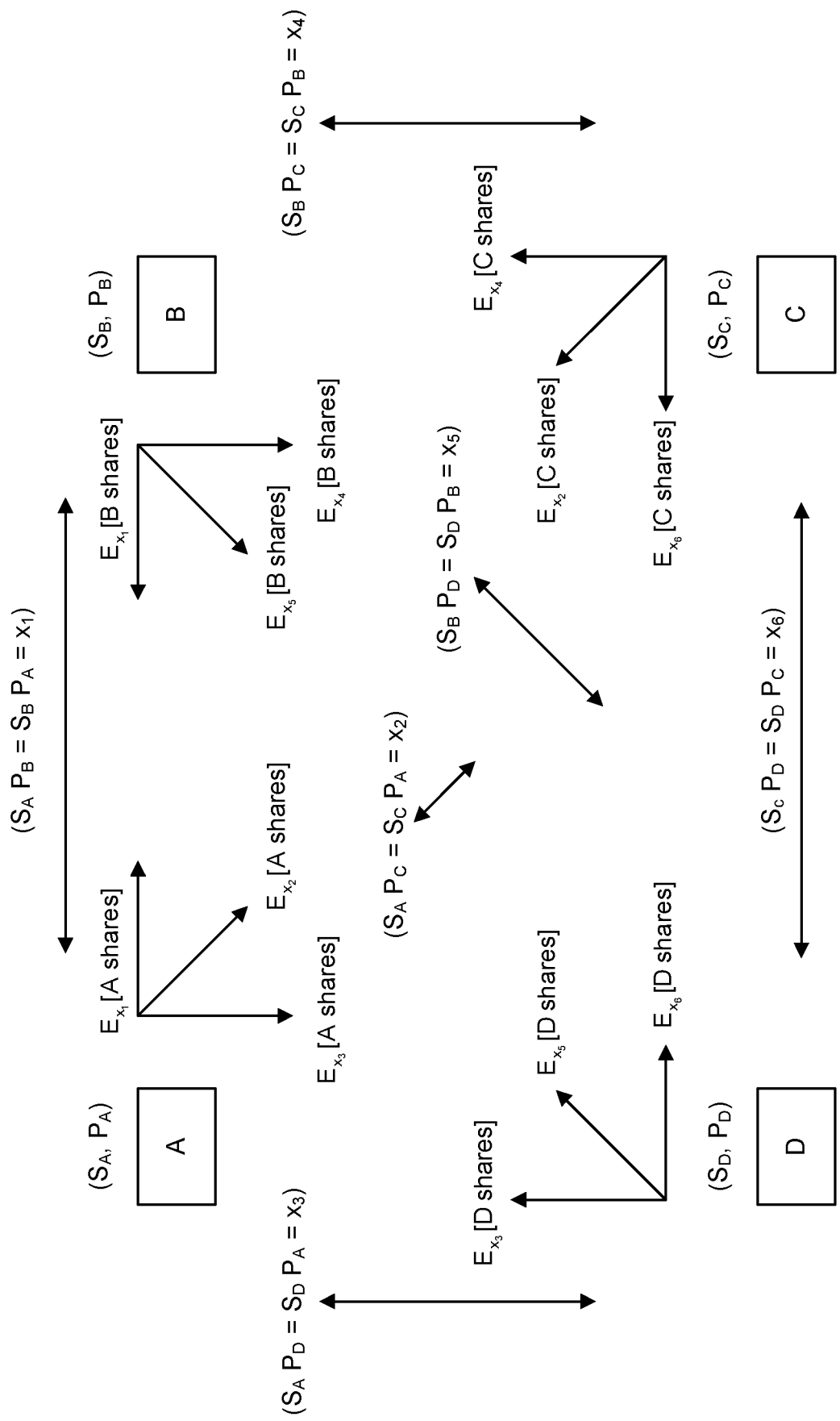
FIG. 10 is a flow chart of a method embodying the present disclosure for sharing a common secret between four nodes.

FIG. 10 shows a method embodying the present disclosure for sharing a first common secret among four nodes A, B, C and D. Each node A, B, C, D is associated with its own private key/public key pair (S, P), the private, public key pair of node A, for example, being $(S_A, P_A)$. Each private or public key may be derived from a respective master private key or master public key for that node and a deterministic key, in a manner similar to that described above with reference to FIGS. 1 to 6. The private-public key pairs are key pairs of an elliptic curve cryptography system where, for example, $P_A = S_A \times G$, where G is the elliptic curve generator point.

Secure communication between each pair of nodes A,B, A,C, A,D, B,C, B,D and C,D is established by determining a second common secret between each pair of nodes using a method as described above with reference to FIGS. 1 to 6. In the arrangement shown in FIG. 10, the following relations apply:

$S_A P_B = S_A S_B G = S_B S_A G = S_B P_A = x_1$ $S_A P_C = S_C P_A = x_2$ $S_A P_D = S_D P_A = x_3$ $S_B P_C = S_C P_B = x_4$ $S_B P_D = S_D P_B = x_5$

And $S_C P_D = S_D P_C = x_6$

The first common secret to be shared among the nodes A, B, C and D is $x_1 \oplus x_2 \oplus x_3 \oplus x_4 \oplus x_5 \oplus x_6$.

Once a secure communication channel has been established between each pair of nodes, each node encrypts shares of the first secret, in the form of combinations of the second secrets known to that node, using private-public key pairs based on those second secrets in a manner similar to the method described with reference to FIGS. 7 and 8. This is done by each node encoding XOR combinations of pairs of the second common secrets x known to that node. Accordingly for node A, common secrets $x_1$, $x_2$ and $x_3$ are known to node A, so node A computes the combinations $x_1 \oplus x_2$, $x_1 \oplus x_3$ and $x_2 \oplus x_3$, and then separately encodes this combination on the basis of the private key of the private-public key pair of its respective communication channel $x_1$, $x_2$ or $x_3$ with each other node. In the present embodiment, the separate combinations $[x_1 \oplus x_2; x_1 \oplus x_3; x_2 \oplus x_3]$ are abbreviated in FIG. 10 as [Ashares]. The encoded combinations are then represented as $E_{x1}[x_1 \oplus x_2; x_1 \oplus x_3; x_2 \oplus x_3]$, or $E_{x1}$[Ashares], $E_{x2}[x_1 \oplus x_2; x_1 \oplus x_3; x_2 \oplus x_3]$, or $E_{x2}$[Ashares] and $E_{x3}[x_1 \oplus x_2; x_1 \oplus x_3; x_2 \oplus x_3]$, or $E_{x3}$[Ashares]. Node A then sends $E_{x1}$[Ashares] to node B, with which $x_1$ is common, $E_{x2}$[Ashares] to node C, with which $x_2$ is common, and $E_{x3}$[Ashares] to node D, with which $x_3$ is common.

In a similar manner, node B computes the following combinations:

$[x_1 \oplus x_4; x_1 \oplus x_5; x_4 \oplus x_5]$=[B shares]

and encrypts and sends the following:

$E_{x1}[x_1 \oplus x_4; x_1 \oplus x_5; x_4 E \oplus x_5]$, $E_{x1}$[B shares] to node A
$E_{x4}[x_1 \oplus x_4; x_1 \oplus x_5; x_4 \oplus x_5] = E_{x4}$[B shares] to node C
$E_{x5}[x_1 \oplus x_4; x_1 \oplus x_5; x_4 \oplus x_5] = E_{x5}$[B shares] to node D Node C computes the following combinations:

$[x_2 \oplus x_4; x_2 \oplus x_6; x_4 \oplus x_6]$=[Cshares] and encrypts and sends the following:

$E_{x2}[x_2 \oplus x_4; x_2 \oplus x_6; x_4 \oplus x_6] = E_{x2}$[Cshares] to node A
$E_{x4}[x_2 \oplus x_4; x_2 \oplus x_6; x_4 \oplus x_6] = E_{x4}$[Cshares] to node B
$E_{x6}[x_2 \oplus x_4; x_2 \oplus x_6; x_4 \oplus x_6] = E_{x6}$[Cshares] to node D And Node D computes the following combinations:

$[x_3 \oplus x_5; x_3 \oplus x_6; x_5 \oplus x_6]$=[Dshares]

and encrypts and sends the following:

$E_{x3}[x_3 \oplus x_5; x_3 \oplus x_6; x_5 \oplus x_6] = E_{x3}$[Dshares] to node A
$E_{x5}[x_3 \oplus x_5; x_3 \oplus x_6; x_5 \oplus x_6] = E_{x5}$[Dshares] to node B
$E_{x6}[x_3 \oplus x_5; x_3 \oplus x_6; x_5 \oplus x_6] = E_{x6}$[Dshares] to node C.

Each of the nodes A, B, C, D receives the encrypted shares from the other nodes and decrypts the encrypted shares in using the private key corresponding to the appropriate second common secret $x_1$, $x_2$, $x_3$, $x_4$, $x_5$ or $x_6$, as a result of which each of the nodes can obtain the threshold number of shares necessary to reconstruct the first common secret $x_1 \oplus x_2 \oplus x_3 \oplus x_4 \oplus x_5 \oplus x_6$ as follows.

Node A receives the shares $x_1 \oplus x_4$, $x_1 \oplus x_5$ and $x_4 \oplus x_5$ from node B and knows $x_1$, $x_2$ and $x_3$ separately, and can therefore calculate $x_4$ and $x_5$ from $x_1 \oplus x_1 \oplus x_4$ and $x_1 \oplus x_1 \oplus x_5$ respectively. Node A also receives the shares $x_2 \oplus x_4$, $x_2 \oplus x_6$ and $x_4 \oplus x_6$ from node C and knows $x_1$, $x_2$ and $x_3$ separately, and can therefore calculate $x_6$ from $x_2 \oplus x_2 \oplus x_6$, and as a result knows $x_1$ to $x_6$ separately and can compute the first common secret.

By operating a similar process, each of the other nodes B, C and D can obtain all of the second common secrets to determine the first common secret which is now shared among all of the nodes.

Figure 11:
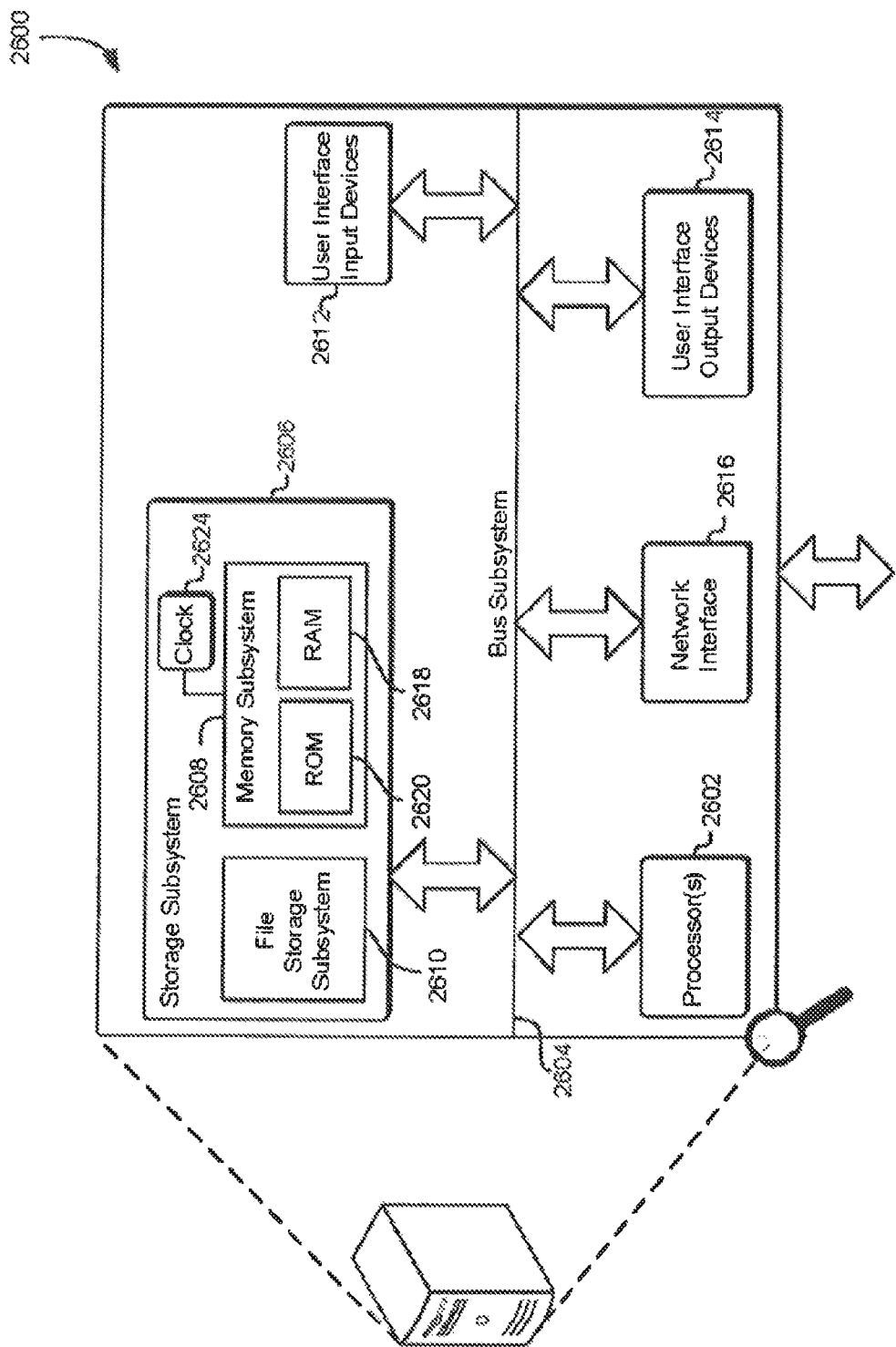
FIG. 11 is a schematic diagram illustrating a computing environment in which various embodiments can be implemented.

Turning now to FIG. 11, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 11, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 11 is intended only as a specific example for purposes of illustrating the preferred embodiment of the device. Many other configurations having more or fewer components than the system depicted in FIG. 11 are possible.

It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of sharing a first common secret among a plurality of nodes,
   wherein each node of said plurality of nodes is associated with a respective asymmetric cryptography first key pair having a respective first private key and a respective first public key of a cryptography system common to said plurality of nodes, and
   wherein the first common secret is based on the first private key of each node of said plurality of nodes,
   the method comprising:
   determining, for at least one first node of said plurality of nodes, a plurality of second common secrets,
   wherein each said second common secret is common to said first node and a respective second node of said plurality of nodes, is determined at said first node based on the first private key of the first node and the first public key of the respective second node, and is determined at the respective second node based on the first private key of the respective second node and the first public key of the first node,
   wherein said first private key of the at least one said first node is determined based on at least a first node master private key (V1c) and a deterministic key (DK) common with the first node and the respective second node, and
   wherein said first public key of the respective second node (P2s) is determined based on a master public key (P1s) of the respective second node and encryption of the deterministic key (DK) using the cryptography system common to said plurality of nodes,
   wherein a plurality of shares of the first common secret are each based on at least one respective second common secret such that said first common secret is accessible using a threshold number of said shares but is inaccessible using less than said threshold number of said shares;
   determining, for the respective second node, at least one respective third common secret, wherein each respective third common secret is common to said respective second node and a respective third node of said plurality of nodes, is determined at said respective second node on the basis of the first private key of the respective second node and the first public key of the third node, and is determined at the third node on the basis of the first private key of the respective third node and the first public key of the respective second node, and
   wherein at least one share of the first common secret is based on at least one respective said third common secret;
   encrypting, by at least one said first node, at least one share of said first common secret known to said first node based on a respective encryption key common to said first node and said respective second node, wherein said respective encryption key is based on a respective said second common secret known to said first node and said respective second node;
   sending at least one said encrypted share from said first node to said respective second node; and
   receiving, by at least one said first node from at least one said respective second node, at least one respective share of said first common secret known to said respective second node and encrypted based on the respective encryption key common to said first node and said respective second node, to enable said first node to access at least one share of said first common secret known to said respective second node,
   wherein each node of said plurality of nodes access the first common secret in response to receiving a threshold number of encrypted shares of the first common secret from respective nodes of the plurality of the nodes.

2. The method according to claim 1, wherein said encrypting comprises encrypting the plurality of shares based on a combination of a plurality of said second or third common secrets known to a corresponding node.

3. The method according to claim 2, wherein said encrypting comprises encrypting each of the plurality of shares based on at least one respective logic XOR combination of a plurality of said second or third common secrets known to a corresponding node.

4. The method according to claim 2, wherein said encrypting comprises encrypting each of the plurality of shares based on multiplicative combination of a plurality of said second or third common secrets known to a corresponding node.

5. The method according to claim 4, wherein the multiplicative combination is of the form (X1. X2. X3) mod n, wherein X1, X2 and X3 are second or third common secrets known to a node, and n is an order of the cryptography system.

6. The method according to claim 1, wherein the plurality of said shares are shares of a first polynomial function, and the first common secret is determined by means of polynomial interpolation of at least a threshold number of said shares.

7. The method according to claim 6, further comprising:
receiving at least a threshold number of shares of said first common secret, wherein each said share corresponds to a respective value of the first polynomial function; and
determining said first polynomial function, by means of determining coefficients of the first polynomial function from a plurality of known values of said shares, to determine said first common secret.

8. The method according to claim 7, wherein the of determining said first polynomial function comprises executing an error correction algorithm.

9. The method according to claim 8, wherein the determining said first polynomial function comprises executing a Berlekamp-Welch decoding algorithm.

10. The method according to claim 7, wherein the determining said first polynomial function comprises: defining an error locator polynomial function and a second polynomial function, wherein the second polynomial function is a product of said first polynomial function and said error locator polynomial function, determining coefficients of said second polynomial function and said error locator polynomial function from a plurality of known values of said first polynomial function, and determining said first polynomial function from said second polynomial function and an error detector polynomial function, to determine the first common secret.

11. The method according to claim 1, wherein at least one said cryptography system has a homomorphic property.

12. The method according to claim 11, wherein at least one said cryptography system is an elliptic curve cryptography system.

13. The method according to claim 1, wherein the deterministic key (DK) is based on a message (M).

14. The method according to claim 13, further comprising:
generating a first signed message (SM1) based on the message (M) and the first private key of the first node ($V_{2C}$); and
sending, over a communications network, the first signed message (SM1) to the second node (S),
wherein the first signed message (SM1) can be validated with a first public key of the first node ($P_{2C}$) to authenticate the first node (C).

15. The method according to claim 14, further comprising: receiving, over a communications network, a second signed message (SM2) from the second node (S); validating the second signed message (SM2) with the first public key of the second node (P2S); and authenticating the second node (S) based on the result of validating the second signed message (SM2), wherein the second signed message (SM2) was generated based on the message (M), or a second message (M2), and the first private key of the second node (V2s).

16. The method according to claim 15, further comprising: generating a message (M); and sending, over a communications network, the message (M) to the second node (S).

17. The method according to claim 15, further comprising: receiving the message (M), over a communications network, from the second node (S).

18. The method according to claim 14, comprising: receiving the message (M) from a data store, and/or an input interface associated with the first node (C).

19. The method according to claim 13, further comprising:
receiving the message (M), over a communications network, from another node.

20. The method according to claim 1, wherein the cryptography system is an elliptic curve cryptography (ECC) system and a first node master public key (P1c) and second node master public key (P1s) are based on elliptic curve point multiplication of respective first node master private key (V1c) and second node master private key (V1s) and a generator (G).

21. The method according to claim 20, further comprising steps of: receiving, over a communications network, the second node master public key (P1s); and storing, at a data store associated with the first node (C), the second node master public key (P1s).

22. The method according to claim 20, further comprising the steps of: generating, at a first node (C), the first node master private key (V1c) and the first node master public key (P1c); sending, over a communications network, the first node master public key (P1c) to the second node (S) and/or other node; and storing, in a first data store associated with the first node (C), the first node master private key (V1c).

23. The method according to claim 1, further comprising: sending, over a communications network, to the respective second node, a notice indicative of using a common cryptography system for a method of determining at least one common secret (CS), and wherein a step of generating the first node master private key (V1c) and a first node master public key (P1c) comprises: generating the first node master private key (V1c) based on a random integer in an allowable range specified in the cryptography system common to the plurality of nodes; and determining the first node master public key (P1c) based on encryption of the first node master private key (V1c).

24. The method according to claim 23, wherein the common cryptography system is an elliptic curve cryptography (ECC) system with a common generator (G) and the first node master public key (P1c) is determined based on elliptic curve point multiplication of the first node master private key (V1c) and the common generator (G) according to the following formula: P1c=V1c×G.

25. The method according to claim 1, wherein: the method further comprises determining the deterministic key (DK) based on determining a hash of a message (M), and determining the first private key of the first node (V2C) is based on a scalar addition of the first node master private key (V1c) and the deterministic key (DK) according to the following formula: V2c=V1c+DK; and
determining the first public key of the second node (P2S) is based on the second node master public key (P1s) with elliptic curve point addition to elliptic curve point multiplication of the deterministic key (DK) and a common generator (G) according to the following formula: P2s=P1s+DK×G, where the deterministic key (DK) is based on determining a hash of a previous deterministic key.

26. A method of secure communication between a plurality of nodes, wherein the method comprises: sharing a first common secret among a plurality of nodes by:
determining, for at least one first node, a plurality of second common secrets, wherein each second common secret is common to said first node and a respective second node, is determined at said first node based on a first private key of the first node and a first public key of the respective second node, and is determined at the respective second node based on a first private key of the second node and a first public key of the first node, wherein said first private key of the at least one said first node is determined based on at least a first node master private key (V1c) and a deterministic key (DK) common with the first node and respective second node, and wherein said first public key of the respective second node (P2s) is determined based on a master public key (P1s) of the respective second node and encryption of the deterministic key (DK) using a cryptography system common to said plurality of nodes, wherein a plurality of shares of the first common secret are each based on at least one respective second common secret such that said first common secret is accessible using a threshold number of said shares but is inaccessible using less than said threshold number of said shares;

determining, for at least one respective second node, at least one respective third common secret, wherein each respective third common secret is common to said respective second node and a respective third node, is determined at said respective second node based on of the first private key of the respective second node and a first public key of the respective third node, and is determined at the respective third node based on a first private key of the respective third node and the first public key of the respective second node, and wherein at least one share of the first common secret is based on at least one respective said respective third common secret;

encrypting, by at least one said first node, at least one share of said first common secret known to said first node based on a respective encryption key common to said first node and the said respective second node, wherein said encryption key is based on a respective said second common secret known to said first node and said respective second node;

sending at least one said encrypted share from said first node to said respective second node; and receiving, by at least one said first node from at least one said respective second node, at least one respective share of said first common secret known to said respective second node and encrypted based on the respective encryption key common to said first node and said respective second node, wherein said encryption key is based on the second common secret common to said first node and said respective second node, to enable said first node to access at least one share of said first common secret known to said respective second node, wherein each node of said plurality of nodes access the first common secret in response to receiving a threshold number of encrypted shares of the first common secret from respective nodes of the plurality of the nodes;

determining a symmetric-key based on the first common secret;

encrypting a first communication message, with the symmetric-key, to an encrypted first communication message; and sending, over a communications network, the encrypted first communication message from one node of said plurality of nodes to the other nodes of said plurality of nodes.

27. The method according to claim 26, further comprising:

receiving, over a communications network, an encrypted second communication message from a node of said plurality of nodes; and decrypting the encrypted second communication message, with the symmetric-key, to a second communication message.

28. A method of performing an online transaction between a plurality of nodes, wherein the method comprises:

sharing a first common secret among a plurality of nodes by:

determining, for at least one first node, a plurality of second common secrets, wherein each said second common secret is common to said first node and a respective second node, is determined at said first node based on a first private key of the first node and a first public key of the respective second node, and is determined at the respective second node based on a first private key of the second node and a first public key of the first node, wherein said first private key of the at least one said first node is determined based on at least a first node master private key (V1c) and a deterministic key (DK) common with the first node and respective second node, and wherein said first public key of the respective second node (P2s) is determined based on a master public key (P1s) of the respective second node and encryption of the deterministic key (DK) using a cryptography system common to said plurality of nodes, wherein a plurality of shares of the first common secret are each based on at least one respective second common secret such that said first common secret is accessible using a threshold number of said shares but is inaccessible using less than said threshold number of said shares;

determining, for at least one respective second node, at least one respective third common secret, wherein each respective third common secret is common to said respective second node and a respective third node, is determined at said respective second node based on the first private key of the respective second node and a first public key of the respective third node, and is determined at the respective third node based on a first private key of the third node and the first public key of the second node, and wherein at least one share of the first common secret is based on at least one respective said third common secret;

encrypting, by at least one said first node, at least one share of said first common secret known to said first node based on a respective encryption key common to said first node and said respective second node, wherein said respective encryption key is based on a respective said second common secret known to said first node and said respective second node;

sending at least one said encrypted share from said first node to said respective second node; and receiving, by at least one said first node from at least one said respective second node, at least one respective share of said first common secret known to said respective second node and encrypted based on the respective encryption key common to said first node and said respective second node, wherein said respective encryption key is based on the second common secret common to said first node and said respective second node, to enable said first node to access at least one share of said first common secret known to said respective second node, wherein each node of said plurality of nodes access the first common secret in response to receiving a threshold number of encrypted shares of the first common secret from respective nodes of the plurality of the nodes;

determining a symmetric-key based on the first common secret;

encrypting a first transaction message, with the symmetric-key, to an encrypted first transaction message; and sending, over a communications network, the encrypted first transaction message from a first node of said plurality of nodes to other nodes of said plurality of nodes.

29. A system, comprising: a processor; and memory including executable instructions that, as a result of execution by the processor, causes the system to perform a method of sharing a first common secret among a plurality of nodes, wherein each node of said plurality of nodes is associated with a respective asymmetric cryptography first key pair having a respective first private key and a respective first public key of a cryptography system common to said plurality of nodes, and wherein the first common secret is based on the first private key of each node of said plurality of nodes, the method comprising:

determining, for at least one first node of said plurality of nodes, a plurality of second common secrets, wherein each said second common secret is common to said first node and a respective second node of said plurality of nodes, is determined at said first node based on the first private key of the first node and the first public key of the respective second node, and is determined at the second node based on the first private key of the respective second node and the first public key of the first node, wherein said first private key of the at least one said first node is determined based on at least a first node master private key (V1c) and a deterministic key (DK) common with the first node and respective second node, and wherein said first public key of the respective second node (P2s) is determined based on a master public key (P1s) of the respective second node and encryption of the deterministic key (DK) using the cryptography system common to said plurality of nodes, wherein a plurality of shares of the first common secret are each based on at least one respective second common secret such that said first common secret is accessible using a threshold number of said shares but is inaccessible using less than said threshold number of said shares;

determining, for at least one respective second node, at least one respective third common secret, wherein each respective third common secret is common to said respective second node and a respective third node of said plurality of nodes, is determined at said respective second node based on the first private key of the second node and the first public key of the respective third node, and is determined at the respective third node based on the first private key of the respective third node and the first public key of the second node, and wherein at least one share of the first common secret is based on at least one respective said third common secret;

encrypting, by at least one said first node, at least one share of said first common secret known to said first node, based on a respective encryption key common to said first node and a said respective second node, wherein said encryption key is based on a respective said second common secret known to said first node and said respective second node;

sending at least one said encrypted share from said first node to said respective second node; and receiving, by at least one said first node from at least one said respective second node, at least one respective share of said first common secret known to said respective second node and encrypted based on the respective encryption key common to said first node and said respective second node, wherein said respective encryption key is based on the respective second common secret common to said first node and said respective second node, to enable said first node to access at least one share of said first common secret known to said respective second node, wherein each node of said plurality of nodes access the first common secret in response to receiving a threshold number of encrypted shares of the first common secret from respective nodes of the plurality of the nodes.

30. A non-transitory computer-readable storage medium having stored thereon executable instructions that, as a result of being executed by a processor of a computer system, cause the computer system to perform a method of sharing a first common secret among a plurality of nodes, wherein each node of said plurality of nodes is associated with a respective asymmetric cryptography first key pair having a respective first private key and a respective first public key of a cryptography system common to said plurality of nodes, and wherein the first common secret is based on the first private key of each node of said plurality of nodes, the method comprising:

determining, for at least one first node of said plurality of nodes, a plurality of second common secrets, wherein each said second common secret is common to said first node and a respective second node of the plurality of nodes, is determined at said first node based on the first private key of the first node and the first public key of the respective second node, and is determined at the respective second node based on the first private key of the respective second node and the first public key of the first node, wherein said first private key of the at least one said first node is determined based on at least a first node master private key (V1c) and a deterministic key (DK) common with the first node and respective second node, and wherein said first public key of the respective second node (P2s) is determined based on a master public key (P1s) of the respective second node and encryption of the deterministic key (DK) using the cryptography system common to said plurality of nodes, wherein a plurality of shares of the first common secret are each based on at least one respective second common secret such that said first common secret is accessible using a threshold number of said shares but is inaccessible using less than said threshold number of said shares;

determining, for at least one respective second node, at least one respective third common secret, wherein each respective third common secret is common to said respective second node and a respective third node of the plurality of nodes, is determined at said respective second node based on the first private key of the respective second node and the first public key of the respective third node, and is determined at the respective third node based on the first private key of the respective third node and the first public key of the respective second node, and wherein at least one share of the first common secret is based on at least one respective said third common secret;

encrypting, by at least one said first node, at least one share of said first common secret known to said first node based on a respective encryption key common to said first node and said respective second node, wherein said encryption key is based on said second common secret known to said first node and said respective second node;

sending at least one said encrypted share from said first node to the respective said respective second node; and receiving, by at least one said first node from at least one said respective second node, at least one respective share of said first common secret known to said respective second node and encrypted based on the respective encryption key common to said first node and said respective second node, wherein said respective encryption key is based on the respective second common secret common to said first node and said respective second node, to enable said first node to access at least one share of said first common secret known to said respective second node, wherein each node of said plurality of nodes access the first common secret in response to receiving a threshold number of encrypted shares of the first common secret from respective nodes of the plurality of the nodes.

\* \* \* \* \*